(12) United States Patent
Kim et al.

(10) Patent No.: US 12,304,191 B2
(45) Date of Patent: May 20, 2025

(54) COVER WINDOW AND METHOD OF MANUFACTURING THE SAME

(71) Applicant: SAMSUNG DISPLAY CO., LTD., Yongin-si (KR)

(72) Inventors: Junyoung Kim, Yongin-si (KR); Dongho Kim, Yongin-si (KR); Jusuk Oh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 274 days.

(21) Appl. No.: 18/113,914

(22) Filed: Feb. 24, 2023

(65) Prior Publication Data

US 2023/0373206 A1 Nov. 23, 2023

(30) Foreign Application Priority Data

May 17, 2022 (KR) .................. 10-2022-0060446
Aug. 4, 2022 (KR) .................. 10-2022-0097574

(51) Int. Cl.
| | | |
|---|---|---|
| *B32B 3/02* | (2006.01) | |
| *B41F 17/00* | (2006.01) | |
| *B41M 1/34* | (2006.01) | |
| *G06F 1/16* | (2006.01) | |
| *H04M 1/18* | (2006.01) | |

(52) U.S. Cl.
CPC .......... *B41F 17/001* (2013.01); *B41F 17/006* (2013.01); *B41M 1/34* (2013.01); *G06F 1/1656* (2013.01); *H04M 1/185* (2013.01); *B32B 3/02* (2013.01)

(58) Field of Classification Search
CPC ...... B42F 17/001; B42F 17/006; B42F 17/30; B42F 16/008; B42K 1/54; B41M 1/34
See application file for complete search history.

(56) References Cited

U.S. PATENT DOCUMENTS

| | | | |
|---|---|---|---|
| 2020/0262194 A1* | 8/2020 | Shim | H04M 1/0266 |
| 2021/0138815 A1* | 5/2021 | Choi | B41M 1/34 |
| 2021/0362488 A1* | 11/2021 | Cheng | B41F 17/001 |
| 2024/0009991 A1* | 1/2024 | Lee | B41F 17/006 |

FOREIGN PATENT DOCUMENTS

| | | |
|---|---|---|
| CN | 211567283 U | 9/2020 |
| CN | 214056881 U | 8/2021 |
| KR | 101189752 B1 | 10/2012 |
| KR | 1020200100904 A | 8/2020 |
| KR | 20210024271 A | 3/2021 |
| KR | 20210030688 A | 3/2021 |

OTHER PUBLICATIONS

KR 20190031398 (Year: 2019).*
KR 20210030688 (Year: 2021).*

* cited by examiner

*Primary Examiner* — Elizabeth E Mulvaney
(74) *Attorney, Agent, or Firm* — CANTOR COLBURN LLP

(57) ABSTRACT

A method of manufacturing a cover window includes: providing first ink to a printing plate, transferring the first ink to a first pad including a pad central area including a central portion of a bottom surface and a pad peripheral area surrounding the pad central area and including a pad groove, and transferring the first ink to a cover window substrate from the first pad, where the transferring of the first ink to the first pad includes transferring the first ink to the pad peripheral area.

21 Claims, 24 Drawing Sheets

COVER WINDOW AND METHOD OF MANUFACTURING THE SAME

This application claims priority to Korean Patent Application Nos. 10-2022-0060446 and 10-2022-0097574, filed on May 17, 2022 and Aug. 4, 2022, respectively, and all the benefits accruing therefrom under 35 U.S.C. § 119, the contents of which in their entirety are herein incorporated by reference.

BACKGROUND

1. Field

One or more embodiments relate to a cover window and a method of manufacturing the same, and more particularly, to a cover window in which the risk of defects in a manufacturing process may be reduced and a method of manufacturing the cover window.

2. Description of the Related Art

A cover window of a display apparatus protects a display device of a display panel included in the display apparatus from external impact and blocks light so that a wiring or a circuit of the display panel is not identified from the outside. To this end, a light-shielding layer is formed on a surface of the cover window. When the cover window is flat, the light-shielding layer is formed by using a silkscreen printing method, and when the cover window is curved, the light-shielding layer is formed by using a pad printing method.

SUMMARY

However, a method of manufacturing a cover window in the related art has problems in that printing is not easy when a portion of a cover window substrate that contacts a pad but does not have a light-shielding layer formed thereon is printed in a subsequent process.

One or more embodiments include a cover window in which the risk of defects in a manufacturing process may be reduced and a method of manufacturing the cover window. However, the embodiments are examples, and do not limit the scope of the disclosure.

Additional aspects will be set forth in part in the description which follows and, in part, will be apparent from the description, or may be learned by practice of the presented embodiments.

According to one or more embodiments, a method of manufacturing a cover window includes: providing first ink to a printing plate, transferring the first ink to a first pad including a pad central area and a pad peripheral area, where the pad central area includes a central portion of a bottom surface and the pad peripheral area surrounds the pad central area and defines a pad groove therein; and transferring the first ink to a cover window substrate from the first pad, where the transferring of the first ink to the first pad includes transferring the first ink to the pad peripheral area.

The transferring of the first ink to the first pad may include not transferring the first ink to a portion of the pad peripheral area in which the pad groove is defined.

The pad peripheral area may include an outer portion of the bottom surface surrounding the central portion of the bottom surface of the first pad and a part of a side surface of the first pad contacting the outer portion of the bottom surface.

The first ink may include a light-shielding material.

The printing plate may include a printing plate central area and a printing plate peripheral area surrounding the printing plate central area, and the printing plate peripheral area may define a printing plate groove therein, where the providing of the first ink to the printing plate may include filling the printing plate groove with the first ink.

The printing plate groove may extend along an outer side of the printing plate central area.

The transferring of the first ink to the first pad may include transferring the first ink to the first pad, by pressing the first pad to the printing plate in a state that the printing plate groove may be filled with the first ink.

The transferring of the first ink to the first pad may include transferring the first ink filling the printing plate groove to the first pad.

The transferring of the first ink to the first pad may include causing the pad central area to contact the printing plate central area and the pad peripheral area to contact the first ink filling the printing plate groove.

The transferring of the first ink to the first pad may include causing a portion of the pad peripheral area in which the pad groove is defined not to contact the first ink filling the printing plate groove.

The transferring of the first ink to the cover window substrate may include transferring the first ink to the cover window substrate, by pressing the first pad to which the first ink is transferred to the cover window substrate.

The transferring of the first ink to the cover window substrate may include transferring the first ink transferred to the first pad to the cover window substrate.

The transferring of the first ink to the cover window substrate may include causing the pad central area and the pad peripheral area to contact the cover window substrate.

The transferring of the first ink to the cover window substrate may include causing a portion of the pad peripheral area in which the pad groove is defined not to contact the cover window substrate.

The first pad may include a silicon-based compound.

The method may further include forming a light-shielding layer and a light-shielding layer hole on the cover window substrate, by heating the cover window substrate to which the first ink is transferred at about 150 degrees in Celsius (° C.) for about 10 minutes.

The method may further include transferring second ink, different from the first ink, to the cover window substrate, and forming a color layer covering the light-shielding layer hole, by heating the cover window substrate to which the second ink is transferred at about 150° C. for about 10 minutes.

The transferring of the second ink, different from the first ink, to the cover window substrate may include transferring the second ink to a part of the cover window substrate exposed through the light-shielding layer hole, by pressing a second pad to which the second ink is transferred to the cover window substrate.

According to one or more embodiments, a cover window includes: a cover window substrate including a transparent area and an opaque area, wherein the transparent area includes a first transparent area and a second transparent area located on opposite sides of the first transparent area in a first direction, and the opaque area includes a first opaque area located on opposite sides of the first transparent area in a second direction crossing the first direction and a second opaque area surrounding the second transparent area, a light-shielding layer located in the opaque area, and a color layer filling a light-shielding layer hole defined in the first opaque area, wherein a carbon (C) content or a silicon (Si)

content of an interface of the cover window substrate contacting the color layer is lower than a C content or an Si content of a surface of the cover window substrate located in the transparent area and close to the light-shielding layer.

The interface of the cover window substrate contacting the color layer may have a C content ranging from about 15 atomic percentages (at %) to about 16 at %, and the surface of the cover window substrate in the transparent area and close to the light-shielding layer may have a C content ranging from about 31 at % to about 33 at %.

The interface of the cover window substrate contacting the color layer may have an Si content ranging from about 19 at % to about 20 at %, and the surface of the cover window substrate in the transparent area and close to the light-shielding layer may have an Si content ranging from about 23 at % to about 24 at %.

Other aspects, features, and advantages of the disclosure will become more apparent from the detailed description, the claims, and the drawings.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
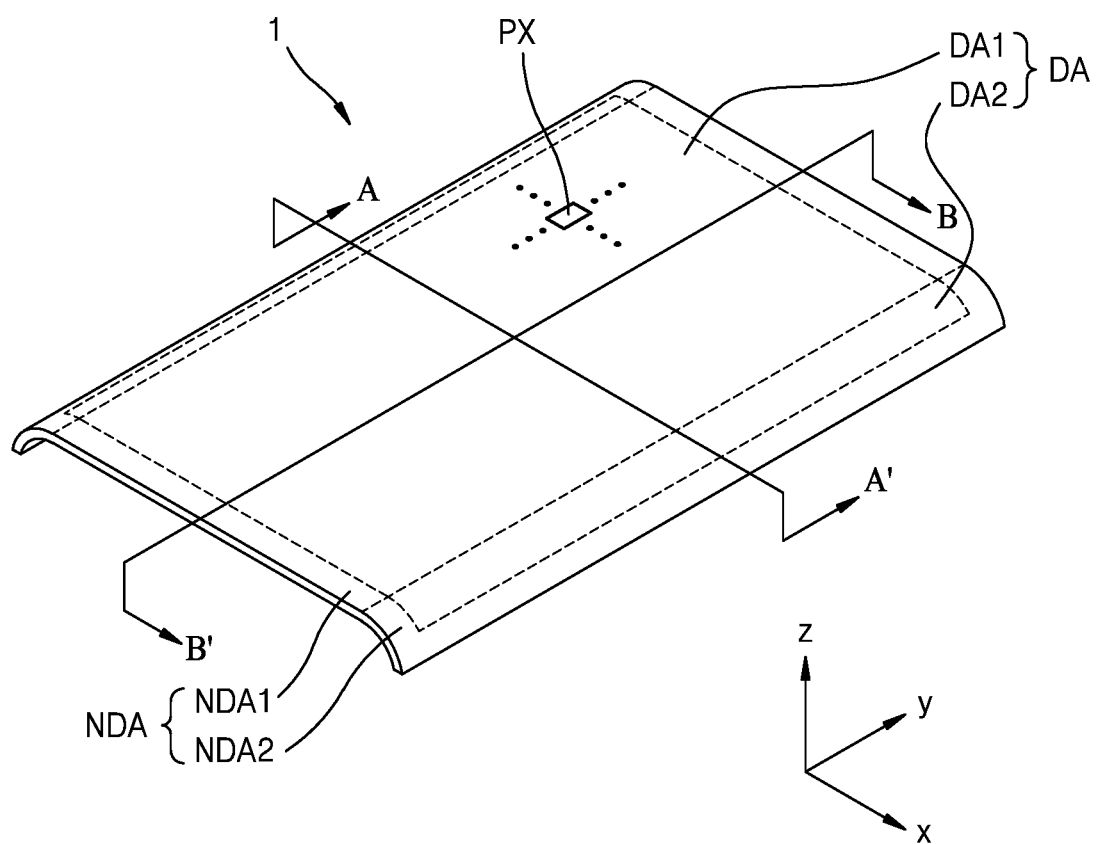
FIG. 1 is a perspective view schematically illustrating a part of a display apparatus including a cover window, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

It will be understood that when a component, such as a layer, a film, a region, or a plate, is referred to as being "on" another component, the component may be directly on the other component or intervening components may be present therebetween. Also, sizes of components in the drawings may be exaggerated or contracted for convenience of explanation. For example, because sizes and thicknesses of elements in the drawings are arbitrarily illustrated for convenience of explanation, the disclosure is not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

It will be further understood that the terms "comprises" or "comprising" used herein specify the presence of stated features or components, but do not preclude the presence or addition of one or more other features or components.

"A and/or B" is used herein to select only A, select only B, or select both A and B. "At least one of A and B" is used to select only A, select only B, or select both A and B.

Figure 2A:
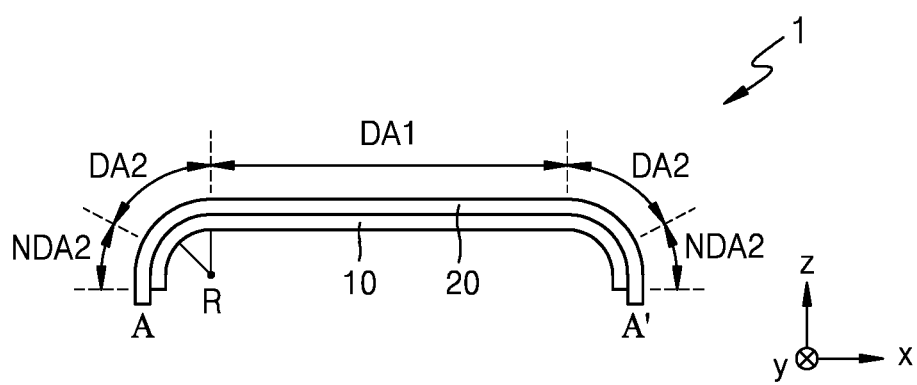
FIG. 2A is a cross-sectional view schematically illustrating the display apparatus taken along line A-A' of FIG. 1.
Figure 2B:
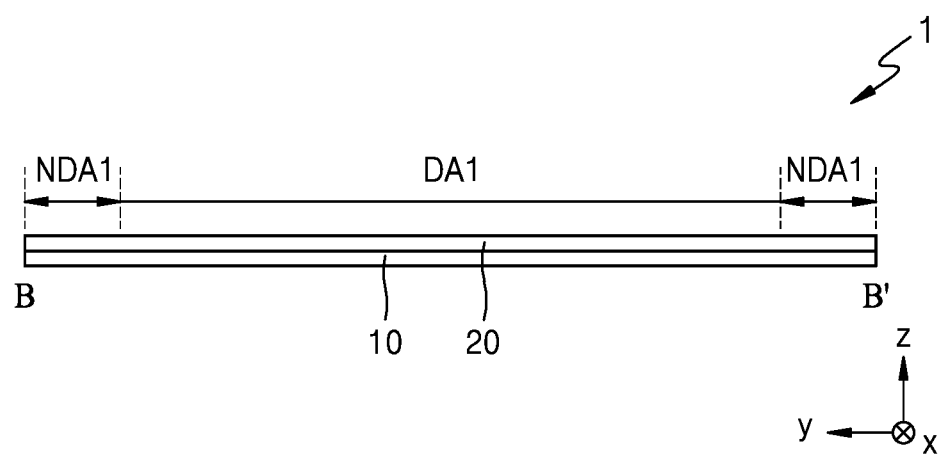
FIG. 2B is a cross-sectional view schematically illustrating the display apparatus taken along line B-B' of FIG. 1.

FIG. 1 is a perspective view schematically illustrating a part of a display apparatus 1 including a cover window 20, according to an embodiment. FIG. 2A is a cross-sectional view schematically illustrating the display apparatus 1 taken along line A-A' of FIG. 1. FIG. 2B is a cross-sectional view schematically illustrating the display apparatus 1 taken along line B-B' of FIG. 1.

The display apparatus 1 that is a device for displaying a moving image or a still image may be a portable electronic device such as a mobile phone, a smartphone, a tablet personal computer ("PC"), a mobile communication terminal, an electronic organizer, an electronic book, a portable multimedia player ("PMP"), a navigation device, or an ultra-mobile PC ("UMPC"). Alternatively, the display apparatus 1 may be an electronic device such as a television, a laptop computer, a monitor, an advertisement board, or an Internet of Things ("IoT") device. Alternatively, the display apparatus 1 may be a wearable device such as a smart watch, a watch phone, a glasses-type display, or a head-mounted display ("HMD"). Alternatively, the display apparatus 1 may be a portion of another device. For example, the display apparatus 1 may be a display portion of an electronic device. Alternatively, the display apparatus 1 may be a center information display ("CID") located on an instrument panel, a center fascia, or a dashboard of a vehicle, a room mirror display replacing a side-view mirror of a vehicle, or a display located on the back of a front seat for entertainment for a back seat of a vehicle.

Referring to FIG. 1, the display apparatus 1 capable of displaying an image may have an edge extending in a first direction and an edge extending in a second direction. The first direction and the second direction may intersect each other. For example, an angle between the first direction and the second direction may be an acute angle. Alternatively, an angle between the first direction and the second direction may be an obtuse angle or a right angle. For convenience of explanation, the following will be described assuming that the first direction and the second direction are perpendicular to each other. For example, the first direction may be an x direction or a −x direction, and the second direction may be a y direction or a −y direction.

As shown in FIG. 1, the display apparatus 1 may include a display area DA and a non-display area NDA surrounding the display area DA. The display apparatus 1 may provide an image through an array of pixels PX that are two-dimensionally arranged in the display area DA. Each pixel PX of the display apparatus 1 is an area where light of a certain color may be emitted, and the display apparatus 1 may provide an image by using light emitted by the pixels PX. For example, each pixel PX may emit red light, green light, or blue light.

As shown in FIG. 1, the display area DA may have a polygonal shape including a quadrangular shape in a plan view. For example, the display area DA may have a rectangular shape in which a horizontal length is greater than a vertical length, a rectangular shape in which a horizontal length is less than a vertical length, or a square shape. Alternatively, the display area DA may have any of various shapes such as an elliptical shape or a circular shape. As used herein, the "plan view" is a view in z direction (i.e., thickness direction of the display device 1).

The display area DA may include a first display area DA1 and a second display area DA2. The first display area DA1 may be a flat area. The display apparatus 1 may provide most of images in the first display area DA1. As shown in FIG. 2A, the second display area DA2 may be located on opposite sides of the first display area DA1, in the first direction (e.g., the x direction or the −x direction). The second display area DA2 may extend in the second direction (e.g., the y direction or the −y direction). The display apparatus 1 may be bent in the second display area DA2. Although a bend area is not located on opposite sides of the first display area DA1 the second direction (e.g., the y direction or the −y direction) in FIG. 2B, the disclosure is not limited thereto. For example, the second display area DA2 that is a bent area may surround the first display area DA1. For convenience of explanation, the following will be described assuming that the second display area DA2 is located on opposite sides of the first display area DA1 only in the first direction (e.g., the x direction or the −x direction).

That is, the second display area DA2 may be defined as a bent area, unlike the first display area DA1, in a cross-section (e.g., a zx cross-section) in the first direction. In contrast, the second display area DA2 may not be bent in a cross-section (e.g., a yz cross-section) in the second direction. That is, the second display area DA2 may be an area bent around an axis extending in the second direction. In FIG. 2A, the second display area DA2 located in the x direction from the first display area DA1 and the second display area DA2 located in the −x direction from the first display area DA1 may have the same curvature. However, the disclosure is not limited thereto. For example, the second display area DA2 located in the x direction from the first display area DA1 and the second display area DA2 located in the −x direction from the first display area DA1 may have different curvatures.

The non-display area NDA may be located outside the display area DA. In detail, the non-display area NDA may include a first non-display area NDA1 and a second non-display area NDA2. The first non-display area NDA1 may be located on opposite sides of the first display area DA1, in the second direction (e.g., the y direction or the −y direction). The second non-display area NDA2 may partially surround the second display area DA2. The pixel PX may not be located in the non-display area NDA. That is, the non-display area NDA may be an area where an image is not displayed. A driving circuit for providing an electrical signal to the pixel PX may be located in the non-display area NDA, or a power supply wiring for providing power to the pixel PX may be located in the non-display area NDA.

A part of the non-display area NDA may be bent. In detail, as shown in FIG. 2A, the second non-display area NDA2 partially surrounding the second display area DA2 may be bent. As shown in FIG. 2B, the first non-display area NDA1 located on opposite sides of the first display area DA1 may not be bent but may be flat. That is, as shown in FIG. 2A, the second non-display area NDA2 and the second display area DA2 may be bent with a radius of curvature R.

Figure 3:
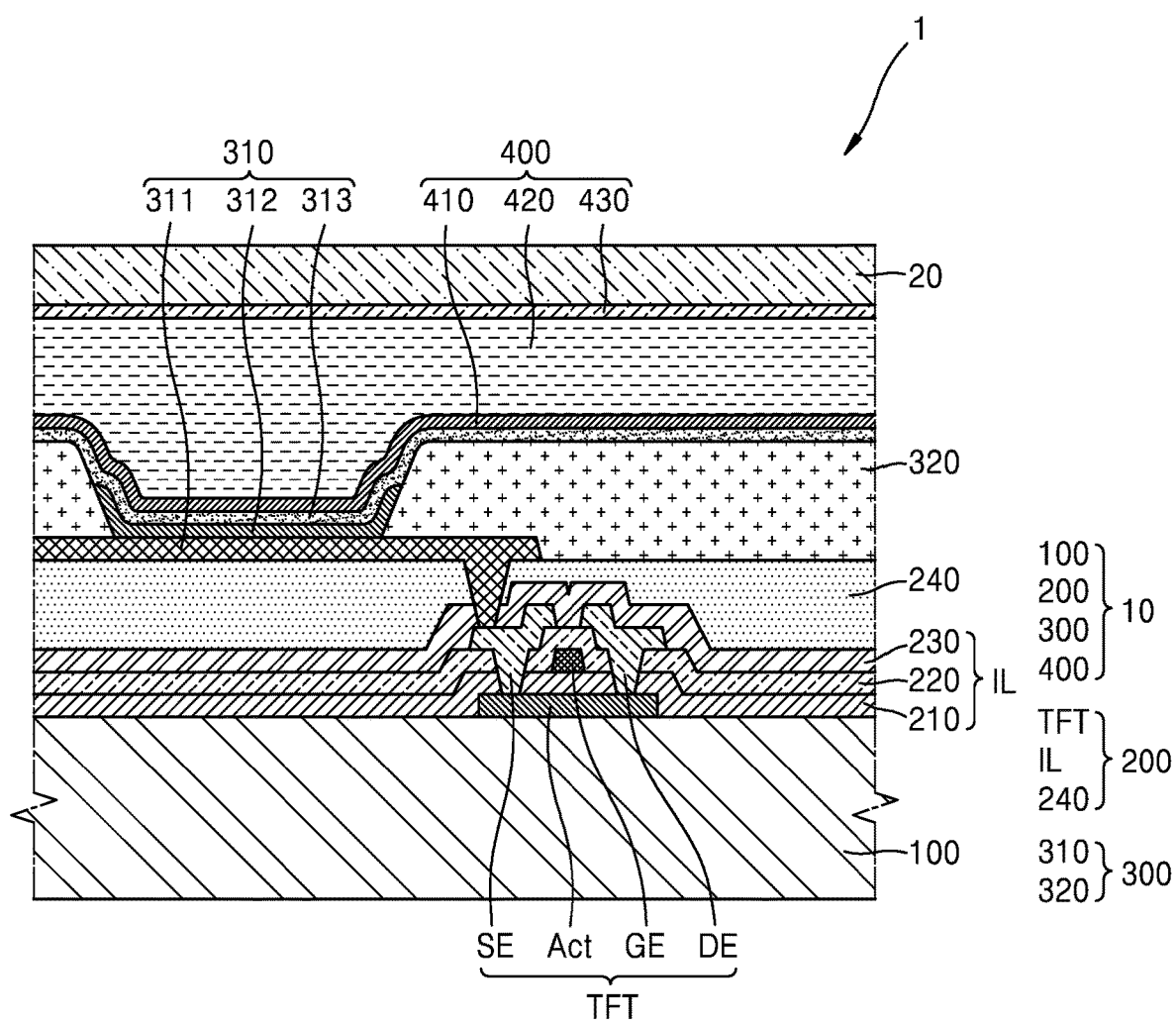
FIG. 3 is a cross-sectional view schematically illustrating a part of a display apparatus including a cover window, according to an embodiment.

FIG. 3 is a cross-sectional view schematically illustrating a part of the display apparatus 1 including the cover window 20, according to an embodiment. The display apparatus 1 may include the cover window 20 and a display panel 10. The display panel 10 may be located under the cover window 20. The display panel 10 may display an image. An image displayed on the display panel 10 may be provided to a user through the transparent cover window 20. That is, an image provided by the display apparatus 1 may be generated by the display panel 10.

As shown in FIG. 3, the display panel 10 may include a substrate 100, a pixel circuit layer 200, a display device layer 300, and an encapsulation layer 400. The pixel circuit layer 200 may be located on the substrate 100. The substrate 100 may include various flexible or bendable materials. For example, the substrate 100 may include glass, a metal, or a polymer resin. Also, the substrate 100 may include a polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate. However, various modifications may be made. For example, the substrate 100 may have a multi-layer structure including two layers each including a polymer resin and a barrier layer including an inorganic material (e.g., silicon oxide, silicon nitride, or silicon oxynitride) and located between the two layers.

The pixel circuit layer 200 may include a thin-film transistor TFT, an insulating layer IL, and a planarization layer 240. The thin-film transistor TFT may include a semiconductor layer Act including amorphous silicon, polycrystalline silicon, an oxide semiconductor material, or an organic semiconductor material, a gate electrode GE, a source electrode SE, and a drain electrode DE, as shown in FIG. 3. The insulating layer IL may include a gate insulating layer 210, a first interlayer insulating layer 220, and a second interlayer insulating layer 230. In order to ensure insulation between the semiconductor layer Act and the gate electrode GE, the gate insulating layer 210 including an inorganic material such as silicon oxide, silicon nitride, and/or silicon oxynitride may be located between the semiconductor layer Act and the gate electrode GE. The first interlayer insulating layer 220 including an inorganic material such as silicon oxide, silicon nitride, and/or silicon oxynitride may be located on the gate electrode GE, and the second interlayer insulating layer 230 may be located to cover the source electrode SE and the drain electrode DE. The insulating layer IL including an inorganic material may be formed through chemical vapor deposition ("CVD") or atomic layer deposition ("ALD"). The planarization layer 240 may be located on the thin-film transistor TFT. The planarization layer 240 may substantially planarize an upper portion of the thin-film transistor TFT. The planarization layer 240 may include an organic material such as acryl, benzocyclobutene ("BCB"), or hexamethyldisiloxane ("HMDSO"). Although the planarization layer 240 has a single-layer structure in FIG. 3, various modifications may be made. For example, the planarization layer 240 may have a multi-layer structure.

The display device layer 300 may be located on the pixel circuit layer 200. The display device layer 300 may include a display device 310 electrically connected to the thin-film transistor TFT and a pixel-defining film 320. The display device 310 may be an organic light-emitting diode including a pixel electrode 311, a counter electrode 315, and an intermediate layer 312 located between the pixel electrode 311 and the counter electrode 315 and including an emission layer. When the display device 310 is electrically connected to the thin-film transistor layer TFT, it may mean that the pixel electrode 311 of the display device 310 is electrically connected to the thin-film transistor layer TFT.

The pixel electrode 311 is electrically connected to the thin-film transistor TFT by contacting any one of the source electrode SE and the drain electrode DE through an opening portion formed in the planarization layer 240 or the like as shown in FIG. 3. The pixel electrode 311 includes a light-transmitting conductive layer formed of a light-transmitting conductive oxide such as ITO, $In_2O_3$, or IZO, and a reflective layer formed of a metal such as aluminum (Al) or silver (Ag). For example, the pixel electrode 311 may have a three-layer structure including ITO/Ag/ITO.

The pixel-defining film 320 may be located on the planarization layer 240. The pixel-defining film 320 defines a pixel by having an opening corresponding to each pixel, that is, an opening through which at least a central portion of the pixel electrode 311 is exposed. Also, as shown in FIG. 3, the pixel-defining film 320 increases a distance between an edge of the pixel electrode 311 and the counter electrode 313 over the pixel electrode 311, to prevent an arc or the like from occurring on the edge of the pixel electrode 311. The pixel-defining film 320 may include an organic material such as polyimide or hexamethyldisiloxane (HMDSO).

The intermediate layer 312 of the display device 310 may include a low molecular weight material or a high molecular weight material. When the intermediate layer 312 includes a low molecular weight material, the intermediate layer 312 may have a single or multi-layer structure in which a hole injection layer ("HIL"), a hole transport layer ("HTL"), an emission layer ("EML"), an electron transport layer ("ETL"), and an electron injection layer ("EIL") are stacked, and may be formed by using vacuum deposition. When the intermediate layer 312 includes a high molecular weight material, the intermediate layer 312 may have a structure including an HTL and an EML. In this case, the HTL may include poly(3,4-ethylenedioxythiophene) ("PEDOT"), and the EML may include a polymer material such as a polyphenylene vinylene ("PPV")-based material or a polyfluorene-based material. The intermediate layer 312 may be formed by using screen printing, inkjet printing, laser-induced thermal imaging ("LITI"), or the like. However, the intermediate layer 312 is not necessarily limited thereto, and may have any of various structures. The intermediate layer 312 may include a layer that is integrally formed over a plurality of pixel electrodes 311, or may include a layer that is patterned to correspond to each of a plurality of pixel electrodes 311.

The counter electrode 313 may be integrally formed over a plurality of display devices 310 to correspond to a plurality of pixel electrodes 311. The counter electrode 313 may include a light-transmitting conductive layer formed of ITO, $In_2O_3$, or IZO, and may include a semi-transmissive film including a metal such as Al or Ag. For example, the counter electrode 313 may be a semi-transmissive film including Mg or Ag.

The encapsulation layer 400 may be located on the display device layer 300. Because the display device 310 may be easily damaged by external moisture, oxygen, or the like, the encapsulation layer 400 may cover and protect the display device 310. The encapsulation layer 400 may include a first inorganic encapsulation layer 410, an organic encapsulation layer 420, and a second inorganic encapsulation layer 430 as shown in FIG. 3.

The first inorganic encapsulation layer 410 may cover the counter electrode 313, and may include silicon oxide, silicon nitride, and/or silicon oxynitride. Other layers such as a capping layer may be located between the first inorganic encapsulation layer 410 and the counter electrode 313. Because the first inorganic encapsulation layer 410 is formed along a lower structure, a top surface of the first inorganic encapsulation layer 410 is not flat as shown in FIG. 3. The organic encapsulation layer 420 covers the first inorganic encapsulation layer 410, and unlike the first inorganic encapsulation layer 410, the organic encapsulation layer 420 may have a substantially flat top surface. The organic encapsulation layer 420 may include at least one material selected from the group consisting of polyethylene terephthalate, polyethylene naphthalate, polycarbonate, polyimide, polyethylene sulfonate, polyoxymethylene, polyarylate, and hexamethyldisiloxane. The second inorganic encapsulation layer 430 may cover the organic encapsulation layer 420, and may include silicon oxide, silicon nitride, and/or silicon oxynitride.

As such, because the encapsulation layer 400 includes the first inorganic encapsulation layer 410, the organic encapsulation layer 420, and the second inorganic encapsulation layer 430, even when cracks occur in the encapsulation layer 400, due to this multi-layer structure, the cracks may not be connected between the first inorganic encapsulation layer 410 and the organic encapsulation layer 420 or between the organic encapsulation layer 420 and the second inorganic encapsulation layer 430. Accordingly, the formation of a path through which external moisture or oxygen penetrates into the display apparatus 1 may be effectively prevented or minimized.

The cover window 20 may be located on the display panel 10. The cover window 20 may cover a top surface of the display panel 10. The cover window 20 may protect the top surface of the display panel 10. Also, because the cover window 20 forms the exterior of the display apparatus 1, the cover window 20 may include a flat surface and a curved surface corresponding to a shape of the display apparatus 1.

The cover window 20 may have a high transmittance to transmit light emitted from the display panel 10, and may have a small thickness to minimize a weight of the display apparatus 1. Also, the cover window 20 may have high strength and hardness to protect the display panel 10 from external impact. The cover window 20 may include a flexible window. The cover window 20 may protect the display panel 10 by being easily bent by an external force without causing cracks or the like. The cover window 20 may be attached to the display panel 10 by an adhesive layer (not shown). The adhesive layer may include an adhesive member such as an optically clear adhesive ("OCA") or a pressure-sensitive adhesive ("PSA").

Although not shown in FIG. 3, a protective film may be located under the display panel 10 to face a bottom surface of the display panel 10 (in a −z direction). In detail, the protective film may be located under the substrate 100 to face a bottom surface of the substrate 100 (in the −z direction). The protective film may protect the display panel 10 during a process of manufacturing the display apparatus. An adhesive layer may be located between the protective film and the substrate 100, and the protective film may be attached to the bottom of the substrate 100 by the adhesive layer. The adhesive layer located between the protective film and the substrate 100 may include at least one of an optically clear resin ("OCR"), an optically clear adhesive (OCA), and a pressure-sensitive adhesive (PSA).

Figure 4A:
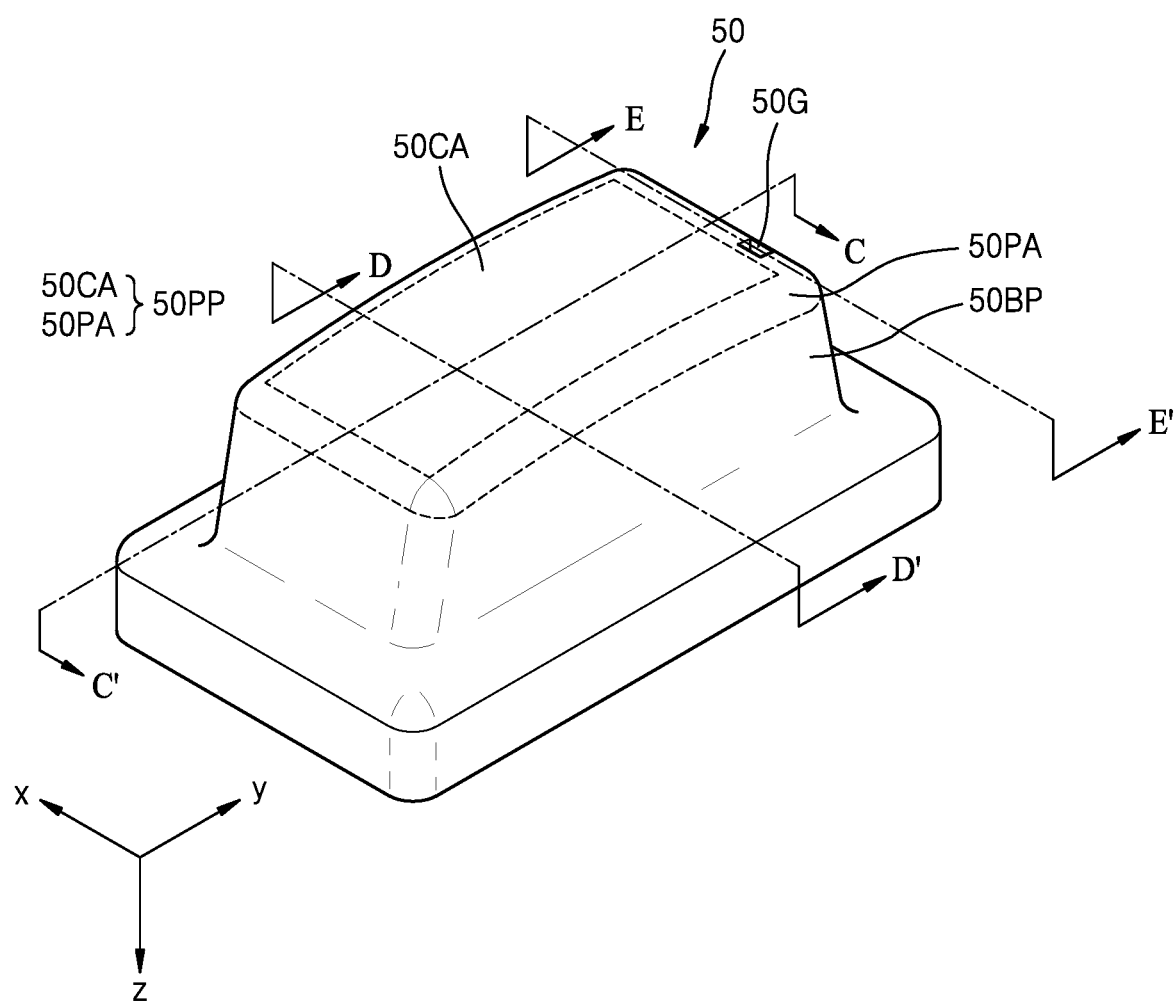
FIG. 4A is a perspective view schematically illustrating a first pad used in a method of manufacturing a cover window, according to an embodiment.
Figure 4B:
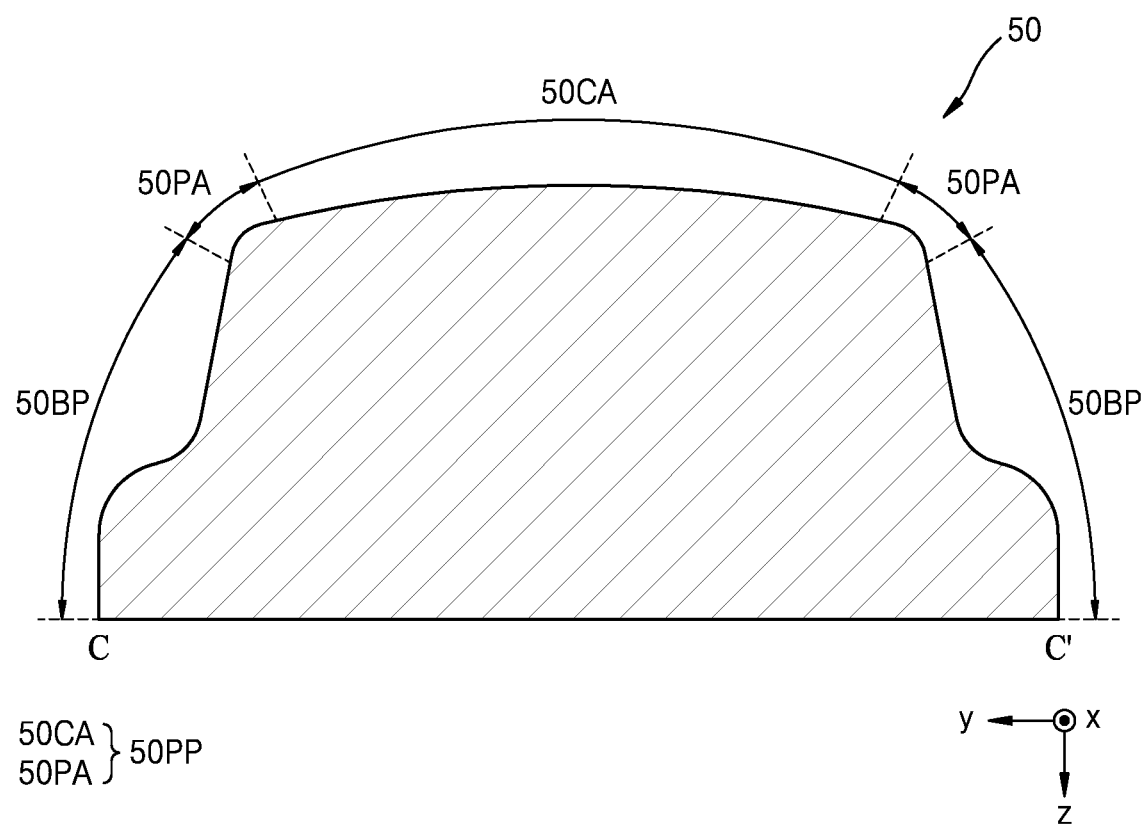
FIG. 4B is a cross-sectional view schematically illustrating the first pad taken along line C-C' of FIG. 4A.
Figure 4C:
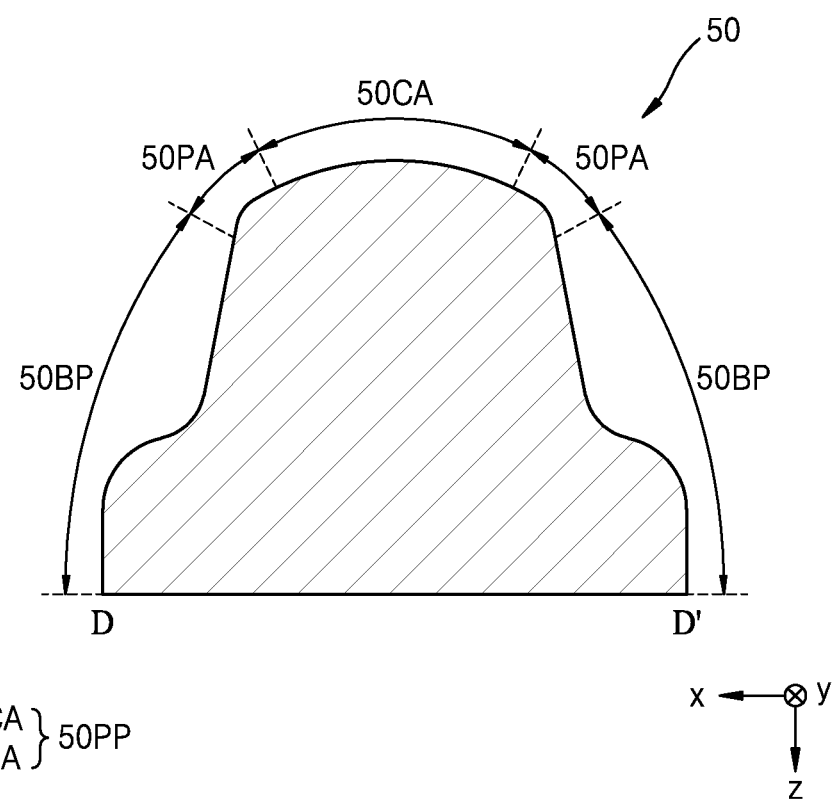
FIG. 4C is a cross-sectional view schematically illustrating the first pad taken along line D-D' of FIG. 4A.
Figure 4D:
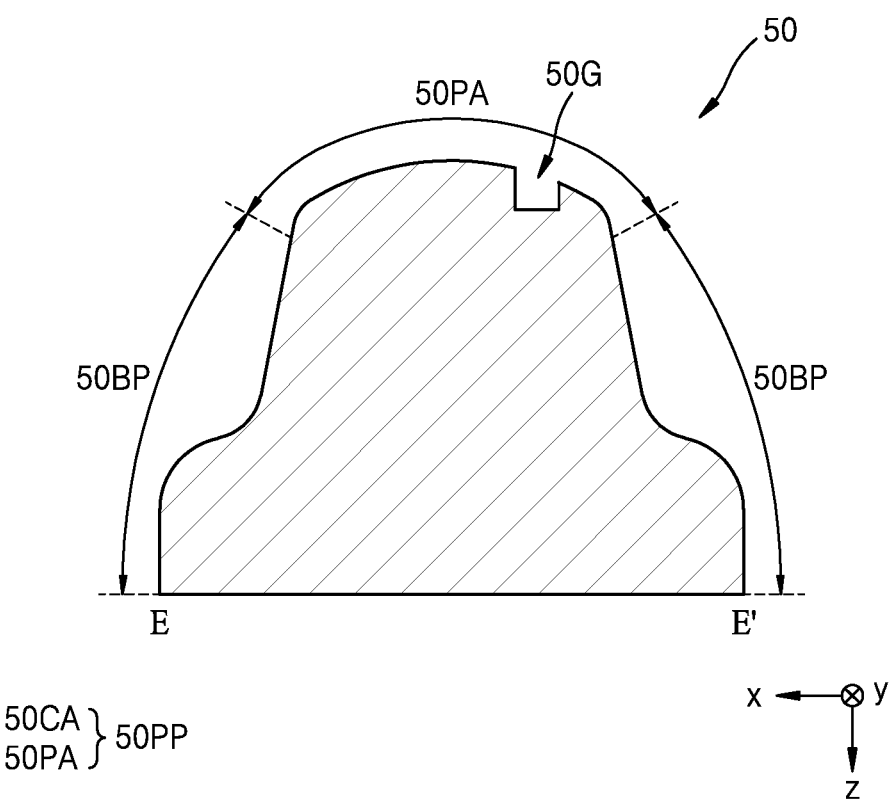
FIG. 4D is a cross-sectional view schematically illustrating the first pad taken along line E-E' of FIG. 4A.

A method of manufacturing a cover window according to an embodiment will now be described. FIG. 4A is a perspective view schematically illustrating a first pad 50 used in a method of manufacturing a cover window, according to an embodiment. FIG. 4B is a cross-sectional view schematically illustrating the first pad 50 taken along line C-C' of FIG. 4A. FIG. 4C is a cross-sectional view illustrating the first pad 50 taken along line D-D' of FIG. 4A. FIG. 4D is a cross-sectional view schematically illustrating the first pad 50 taken along line E-E' of FIG. 4A. For convenience of explanation, FIGS. 4A and 4B illustrate a state where the first pad 50 is turned upside down so that a bottom surface of the first pad 50 (in the −z direction) faces upward.

Although the first pad 50 has a rectangular shape in a plan view in FIG. 4A, the disclosure is not limited thereto. For example, the first pad 50 may have any of various shapes other than a rectangular shape in a plan view. The first pad 50 may include an elastic material. For example, the first pad 50 may include a silicon-based compound. The first pad 50 may be formed of a silicone material. Accordingly, when the first pad 50 is pressed while contacting a printing plate 60 or a cover window substrate 21, the first pad 50 may be compressed or stretched.

The first pad 50 may include a printing unit 50PP and a main body portion 50BP. When ink is transferred to the first pad 50 or is transferred from the first pad 50, the printing unit 50PP may be a portion contacting the printing plate 60 or the cover window substrate 21. The printing unit 50PP may have a gentle curvature at a central portion. In detail, the central portion of the printing unit 50PP may be bent in the first direction (e.g., the x direction or the −x direction), and may also be bent in the second direction (e.g., the y direction or the −y direction). That is, as shown in FIG. 4C, the central portion of the printing unit 50PP may be bent in a cross-section (e.g., a zx cross-section) in the first direction, and as shown in FIG. 4B, may also be bent in a cross-section (e.g., a yz cross-section) in the second direction. The main body portion 50BP that is a portion of the first pad 50 other than the printing unit 50PP may be a portion that supports the first pad 50 but does not contact the printing plate 60 or the cover window substrate 21 in a process of transferring ink to the first pad 50 or transferring ink from the first pad 50.

The printing unit 50PP may include a pad central area 50CA and a pad peripheral area 50PA surrounding the pad central area 50CA. The pad central area 50CA may be located at the central portion of the printing unit 50PP. In detail, the pad central area 50CA may include a central portion of a bottom surface of the printing unit 50PP (in the −z direction). That is, the pad central area 50C may include a central portion of a bottom surface of the first pad 50 (in the −z direction). The pad peripheral area 50PA may be located outside the pad central area 50CA. The pad peripheral area 50PA may surround the central portion of the printing unit 50PP. In detail, the pad peripheral area 50PA may include an outer portion of the bottom surface surrounding the central portion of the bottom surface of the printing unit 50PP (in the −z direction) and a part of a side surface of the printing unit 50PP contacting the outer portion. That is, the pad peripheral area 50PA may include an outer portion of the bottom surface surrounding the central portion of the bottom surface of the first pad 50 (in the −z direction) and a part of a side surface of the first pad 50 contacting the outer portion.

As shown in FIG. 4D, a pad groove 50G may be defined in the pad peripheral area 50PA of the printing unit 50PP. In detail, the pad groove 50G may be defined in the bottom (in the −z direction), included in the pad peripheral area 50PA. Accordingly, when ink is transferred to the first pad 50, the ink may not be transferred to a portion of the pad peripheral area 50PA in which the pad groove 50G is defined. Also, when ink is transferred from the first pad 50, a portion of a target object corresponding to the pad groove 50G may not contact the first pad 50 and ink may not be transferred to the portion of the target object. A depth of the pad groove 50G may range from 2.4 millimeters (mm) to 7.2 mm from the bottom surface of the printing unit 50PP (in the −z direction). When a depth of the pad groove 50G is less than 2.4 mm from the bottom surface of the printing unit 50PP (in the −z direction), ink may be transferred even to a portion of the pad peripheral area 50PA in which the pad groove 50G is defined. Also, when ink is transferred from the first pad 50, a portion of a target object corresponding to the pad groove 50G may contact the first pad 50 or the ink may be transferred to the portion of the target object. When a depth of the pad groove 50G exceeds 7.2 mm from the bottom surface of the printing unit 50PP (in the −z direction), costs for manufacturing a pad may increase.

Although FIGS. 4A and 4D illustrate that one pad groove 50G is defined in the pad peripheral area 50PA located on the bottom surface of the printing unit 50PP (in the −z direction), the disclosure is not limited thereto. For example, a plurality of pad grooves 50G may be defined in the pad peripheral area 50PA located on the bottom surface of the printing unit 50PP (in the −z direction), and the pad grooves 50G may be spaced apart from each other. The plurality of pad grooves 50G may have the same shape or similar shapes, and may have the same size or similar sizes. Alternatively, the plurality of pad grooves 50G may have different shapes or may have different sizes. For convenience of explanation, the following will be described assuming that one pad groove 50G is defined in the pad peripheral area 50PA located on the bottom surface of the printing unit 50PP (in the −z direction).

Figure 5:
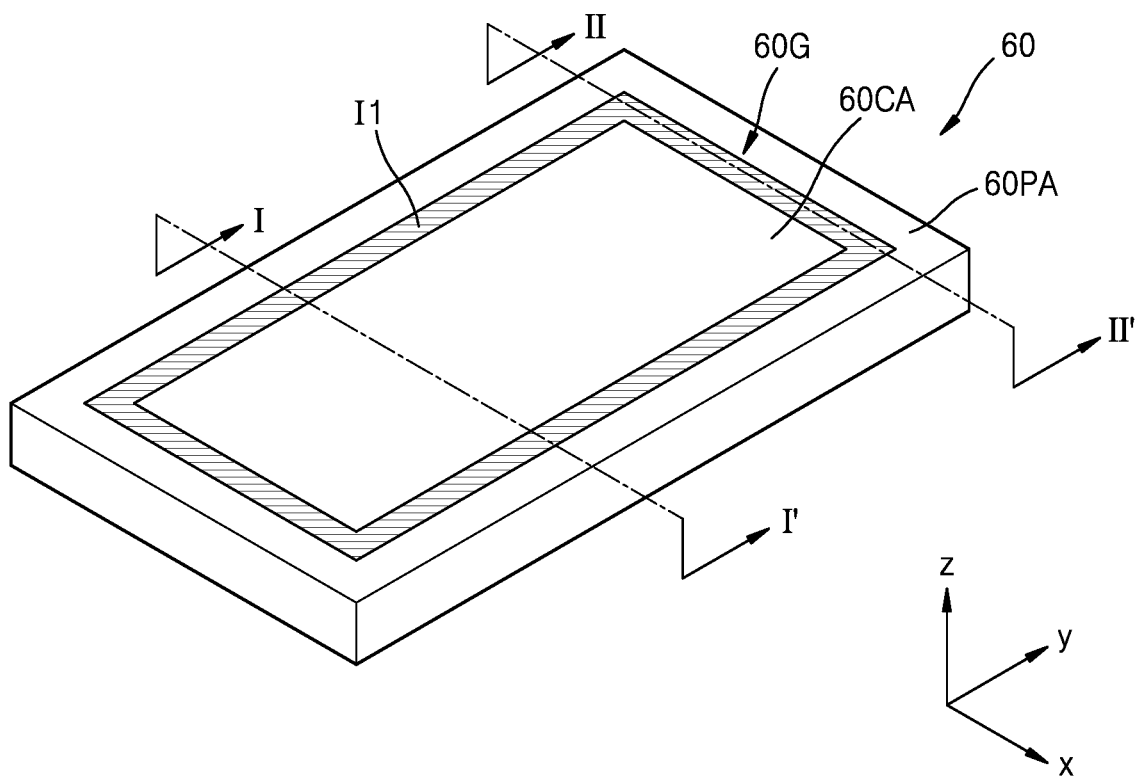
FIGS. 5 through 17 are views for describing a method of manufacturing a cover window, according to an embodiment.
Figure 6:
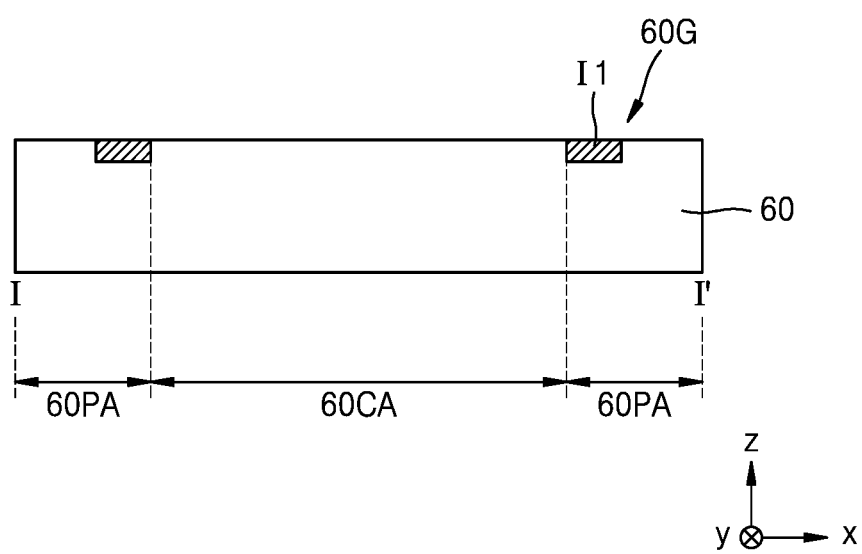

FIGS. 5 through 17 are views for describing a method of manufacturing a cover window, according to an embodiment. FIGS. 5 and 6 are views for describing a step of providing first ink I1 to the printing plate 60 in a method of manufacturing a cover window, according to an embodiment. In detail, FIG. 6 is a cross-sectional view schematically illustrating the printing plate 60, a printing plate groove 60G, and the first ink I1 taken along line I-I' of FIG. 5.

As shown in FIGS. 5 and 6, the printing plate 60 may be a substantially flat plate used in a pad printing method. The printing plate 60 may include a printing plate central area 60CA and a printing plate peripheral area 60PA. The printing plate central area 60CA may have a shape corresponding to a transparent area TA (see FIG. 18) of the cover window 20. For example, when the transparent area TA of the cover window 20 has a long rectangular shape, the printing plate central area 60CA may have a long rectangular shape. The printing plate peripheral area 60PA may surround the printing plate central area 60CA.

The printing plate groove 60G may be defined in the printing plate peripheral area 60PA. The printing plate groove 60G may extend along an outer side of the printing plate central area 60CA. For example, the printing plate groove 60G may be formed around the printing plate central area 60CA. For example, the printing plate groove 60G may have a quadrangular frame shape with an empty center in a plan view. The printing plate groove 60G may have a shape corresponding to an image shape to be printed on the cover window 20. That is, an image shape to be printed on the cover window 20 may be formed as an engraved image area in a top surface of the printing plate 60, and the printing plate groove 60G may be the engraved image area corresponding to the image shape to be printed on the cover window 20. The printing plate groove 60G may be filled with the first ink I1.

The first ink I1 may include a light-shielding material. That is, the first ink I1 may include an opaque material that blocks light. The light-shielding material may include at least one of a black dye and black particles. For example, the light-shielding material may include Cr, $CrO_X$, $Cr/CrO_X$, $Cr/CrO_X/CrN_Y$, a resin (carbon pigment or RGB mixed pigment), graphite, a non-Cr based material, a lactam-based pigment, or a perylene-based pigment. The light-shielding material may include a black organic pigment, and the black organic pigment may include at least one selected from the group consisting of aniline black, lactam black, and perylene black.

Figure 7:
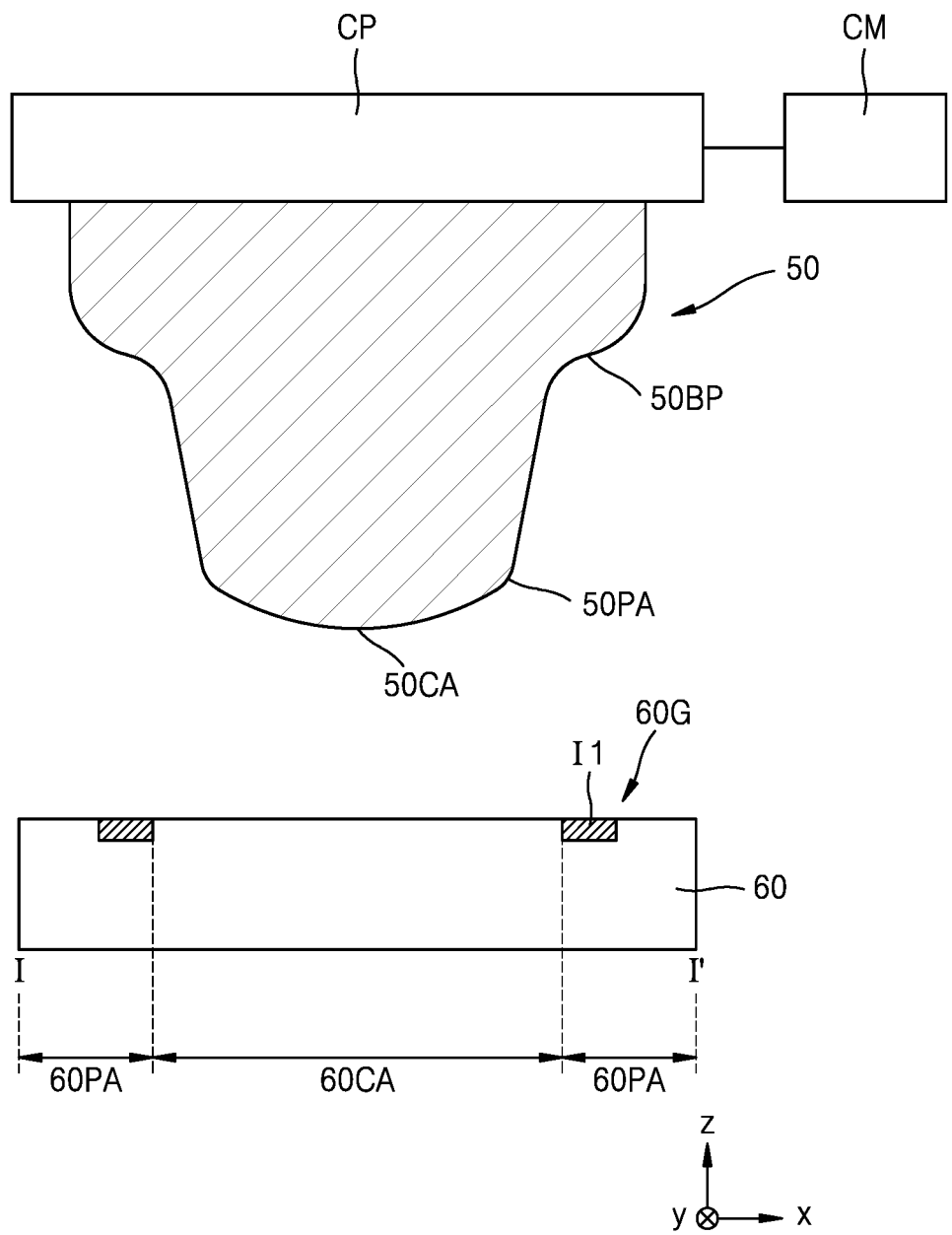
Figure 8:
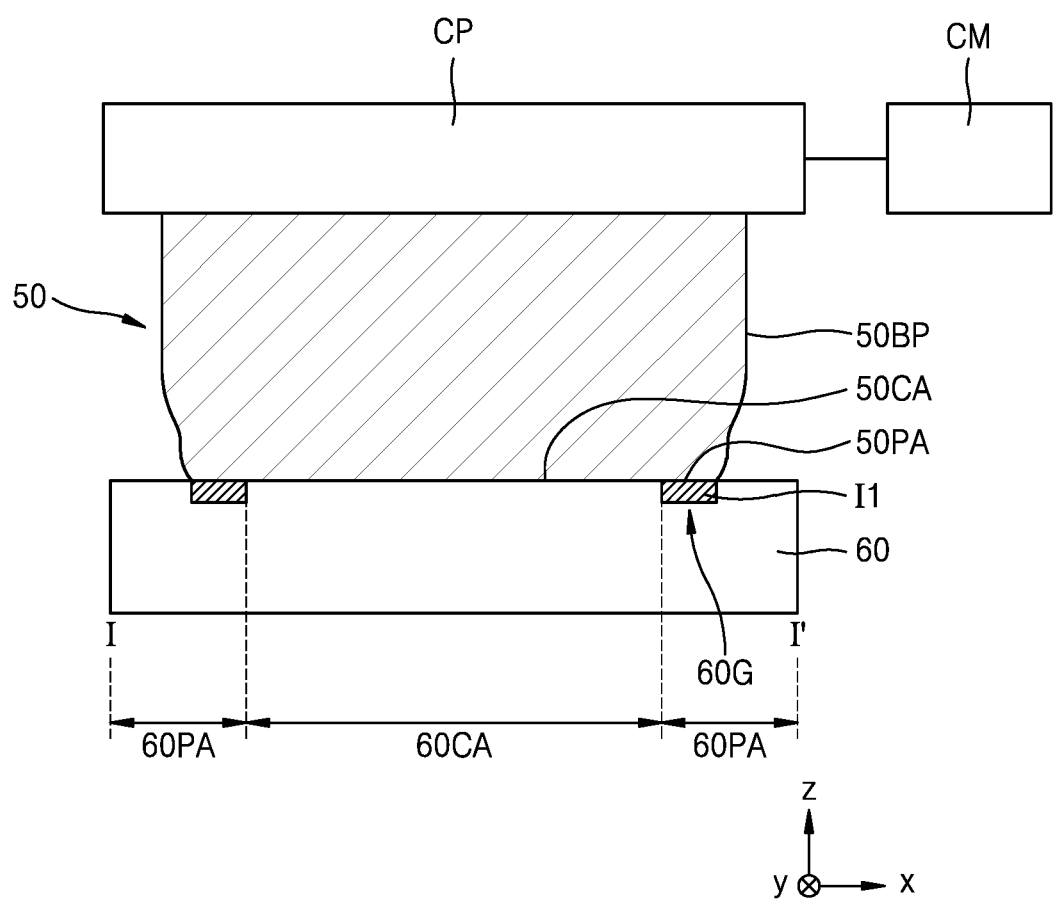
Figure 9:
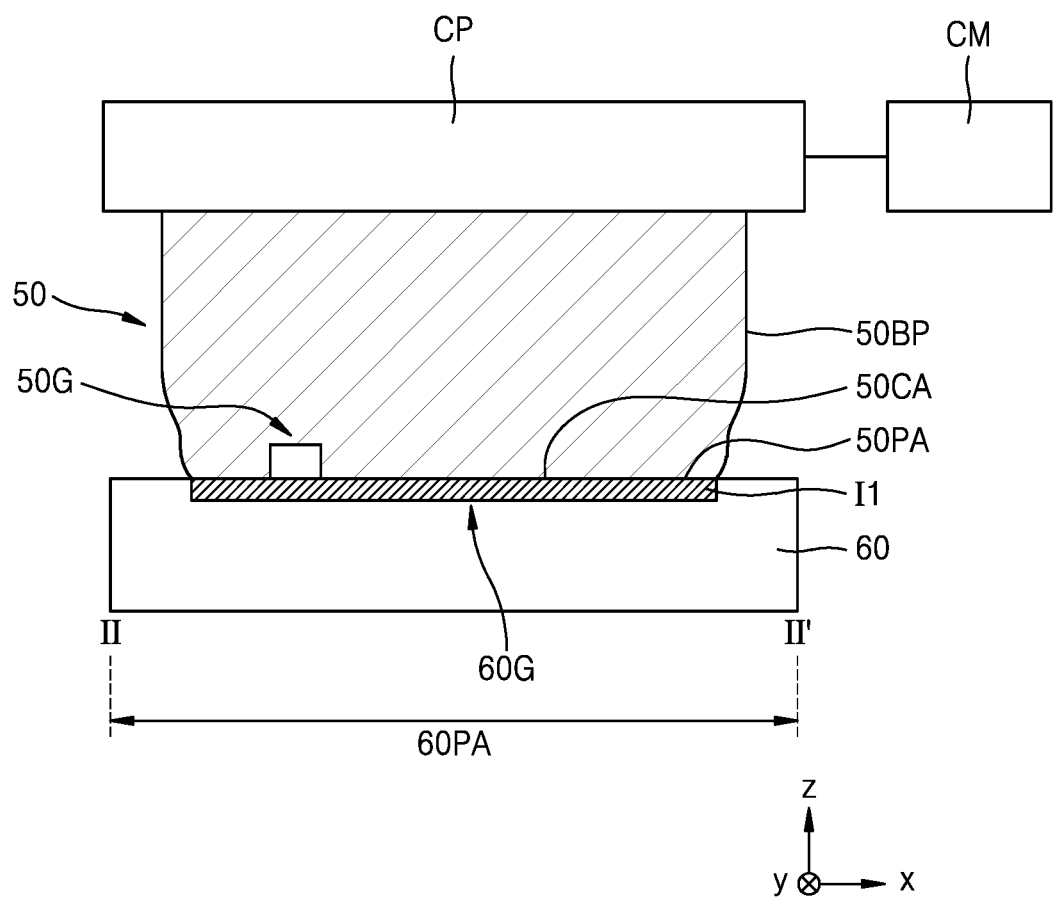

FIGS. 7 through 9 are views for describing a step of transferring the first ink I1 to the first pad 50 in a method of manufacturing a cover window, according to an embodiment. FIG. 7 is a cross-sectional view illustrating the printing plate 60 taken along line I-I' of FIG. 5, especially illustrating the first pad 50 and the printing plate 60 when the first pad 50 is located over the printing plate 60. FIG. 8 is a cross-sectional view illustrating the printing plate 60 taken along line I-I' of FIG. 5, especially illustrating the first pad 50 and the printing plate 60 when the first pad 50 is pressed against the printing plate 60. FIG. 9 is a cross-sectional view illustrating the printing plate 60 taken along line II-II' of FIG. 5, especially illustrating the first pad 50 and the printing plate 60 when the first pad 50 is pressed against the printing plate 60.

First, as shown in FIG. 7, a bottom surface of the first pad 50 (in the −z direction) may be located to face the printing plate 60, and then the first pad 50 and the printing plate 60 may be aligned with each other. In detail, the first pad 50 may be located over the printing plate 60 so that the pad central area 50CA corresponds to the printing plate central area 60CA.

Next, as shown in FIG. 8, the first pad 50 may be pressed against the printing plate 60, by pressing the first pad 50. The first pad 50 may be connected to a control device CM. In detail, the first pad 50 may be attached to a surface of a connecting unit CP connected to the control device CM. Accordingly, the control device CM may control a movement of the first pad 50, and as the first pad 50 is moved toward the printing plate 60 (e.g., in the −z direction) by the control device CM, the first pad 50 may be pressed against the printing plate 60. Because the first pad 50 includes an elastic material such as a silicon-based compound, when pressure is applied to the first pad 50, the first pad 50 may be compressed or stretched. Accordingly, the pad central area 50CA of the first pad 50 may contact the printing plate central area 60CA of the printing plate 60, and the pad peripheral area 50PA of the first pad 50 may contact the first ink I1 filling the printing plate groove 60G of the printing plate 60. Accordingly, the first ink I1 may be transferred to the pad peripheral area 50PA of the first pad 50. The first ink I1 transferred to the pad peripheral area 50PA may be at least part of the first ink I1 filling the printing plate groove 60G of the printing plate 60.

As shown in FIG. 9, because a portion of the pad peripheral area 50PA in which the pad groove 50G is defined does not contact the first ink I1 filling the printing plate groove 60G of the printing plate 60, the first ink I1 may not be transferred to the portion of the pad peripheral area 50PA in which the pad groove 50G is defined. Next, when the first pad 50 is moved away from the printing plate 60 (e.g., in the z direction) by the control device CM, the first pad 50 may be separated from the printing plate 60.

Figure 10:
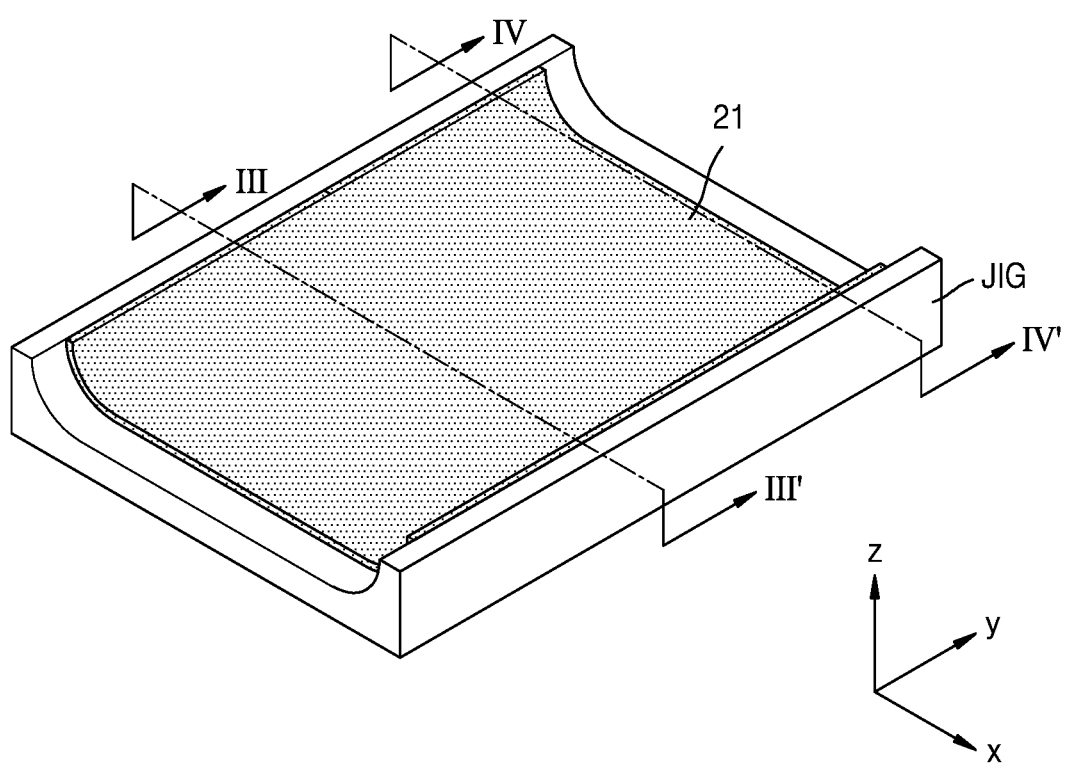
Figure 11:
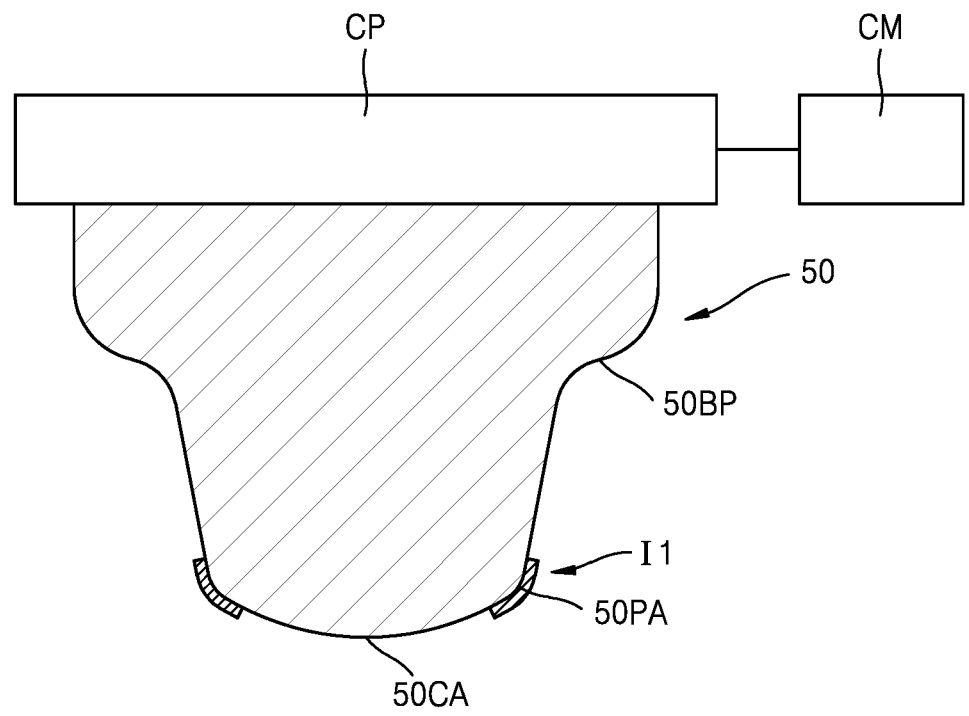
Figure 11:
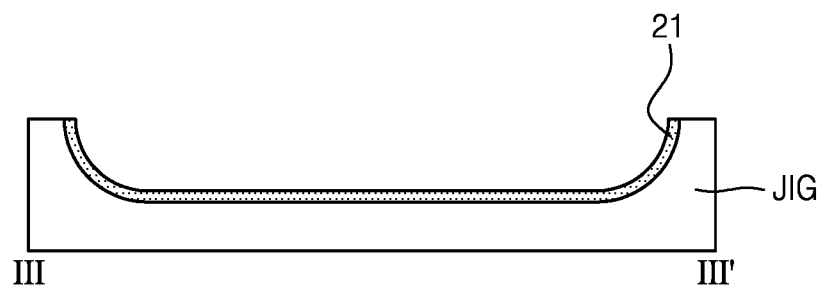
Figure 11:
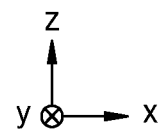
Figure 12:
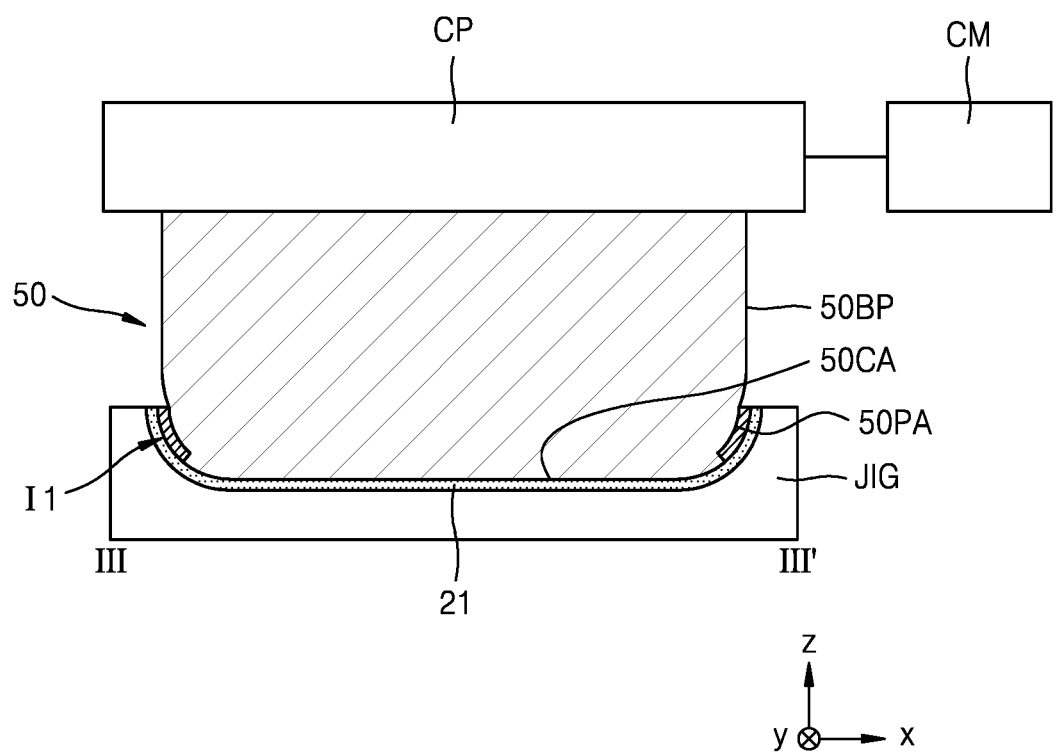
Figure 13:
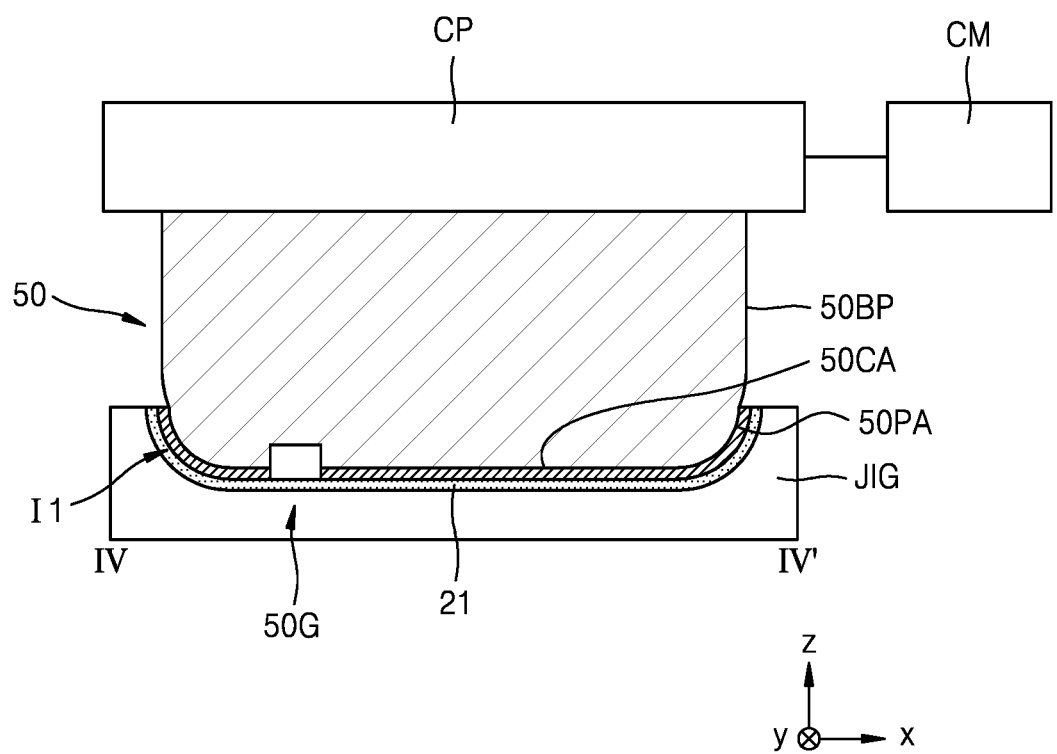

FIGS. 10 through 13 are views for describing a step of transferring the first ink I1 to the cover window substrate 21 in a method of manufacturing a cover window, according to an embodiment. FIG. 11 is a cross-sectional view illustrating the cover window substrate 21 taken along line III-III' of FIG. 10, especially illustrating the first pad 50 and the cover window substrate 21 when the first pad 50 is located over the cover window substrate 21. FIG. 12 is a cross-sectional view illustrating the cover window substrate 21 taken along line III-III' of FIG. 10, especially illustrating the first pad 50 and the cover window substrate 21 when the first pad 50 is pressed against the cover window substrate 21. FIG. 13 is a cross-sectional view illustrating the cover window substrate 21 taken along line IV-IV' of FIG. 10, especially illustrating the first pad 50 and the cover window substrate 21 when the first pad 50 is pressed against the cover window substrate 21.

First, as shown in FIG. 10, the cover window substrate 21 may be prepared. The cover window substrate 21 may be deformed to have a flat surface and a curved surface, by using a jig including a concave surface corresponding to a final shape of the cover window 20. That is, the jig may be a frame having a shape of a display apparatus to be finally manufactured. The cover window substrate 21 may be deformed into a shape of the concave surface of the jig by closely attaching the cover window substrate 21 to the concave surface of the jig.

Next, as shown in FIG. 11, a bottom surface of the first pad 50 (in the −z direction) may be located to face the cover window substrate 21, and then the first pad 50 and the cover window substrate 21 may be aligned with each other. In detail, the first pad 50 may be located over the cover window substrate 21 so that the pad central area 50CA corresponds to a flat area of a central portion of the cover window substrate 21.

Next, as shown in FIG. 12, the first pad 50 may be pressed against the cover window substrate 21, by pressing the first pad 50. As the first pad 50 is moved toward the cover window substrate 21 (e.g., the −z direction) by the control device CM, the first pad 50 may be pressed against the cover window substrate 21. Accordingly, the pad central area 50CA and the pad peripheral area 50PA of the first pad 50 may contact the cover window substrate 21. Accordingly, the first ink I1 transferred to the pad peripheral area 50PA of the first pad 50 may be transferred to the cover window substrate 21. The first ink I1 transferred to the cover window substrate 21 may be at least a part of the first ink I1 transferred to the pad peripheral area 50PA. A portion of the cover window substrate 21 contacting the pad central area 50CA may contact the first pad 50 but the first ink I1 may not be transferred to the portion of the cover window substrate 21 contacting the pad central area 50CA.

As shown in FIG. 13, a portion of the pad peripheral area 50PA in which the pad groove 50G is defined may not contact the cover window substrate 21. That is, inner side of the pad groove 50G may not contact the cover window substrate 21. When compared to the portion of the cover window substrate 21 contacting the pad central area 50CA, the portion of the cover window substrate 21 corresponding to the pad groove 50G may not contact the first pad 50 and the first ink I1 may not be transferred to the portion of the cover window substrate 21 corresponding to the pad groove 50G.

In a process of transferring the first ink I1 transferred to the first pad 50 to the cover window substrate 21, a surface of a portion of the cover window substrate 21 contacting the first pad 50 may be contaminated with a foreign material. For example, a surface of the portion of the cover window substrate 21 contracting the pad central area 50CA may be contaminated with a foreign material. The foreign material may include at least one of silicone oil, an organic material, and dust. For example, when the first pad 50 includes a silicon-based compound, a surface of the portion of the cover window substrate 21 contacting the first pad 50 may be contaminated with silicone oil. The silicone oil may include at least one of hexamethyldisiloxane, octamethyltrisiloxane, decamethyltetrasiloxane, dodecamethylpentasiloxane, and polydimethylsiloxane.

Accordingly, a carbon (C) content and a silicon (Si) content of a surface of the portion of the cover window substrate 21 contacting the pad central area 50CA may be higher than a carbon (C) content and a silicon (Si) content of a surface of the portion of the cover window substrate 21 corresponding to the pad groove 50G. A "surface of the cover window substrate 21" used herein refers to a portion from a contact point between the cover window substrate 21 and the outside of the cover window substrate 21 to a depth of about 10 nanometers (nm) inside the cover window substrate 21. That is, a carbon (C) content and a silicon (Si) content of the surface of the portion of the cover window substrate 21 corresponding to the pad groove 50G may be lower than a carbon (C) content and a silicon (Si) content of the surface of the portion of the cover window substrate 21 contacting the pad central area 50CA. For example, the surface of the portion of the cover window substrate 21 contacting the pad central area 50CA may have a C content ranging from about 31 atomic percentage (at %) to about 33 at % and an Si content ranging from about 23 at % to about 24 at %, and the surface of the portion of the cover window substrate 21 corresponding to the pad groove 50G may have a C content ranging from about 15 at % to about 16 at % and an Si content ranging from about 19 at % to about 20 at %.

Figure 14:
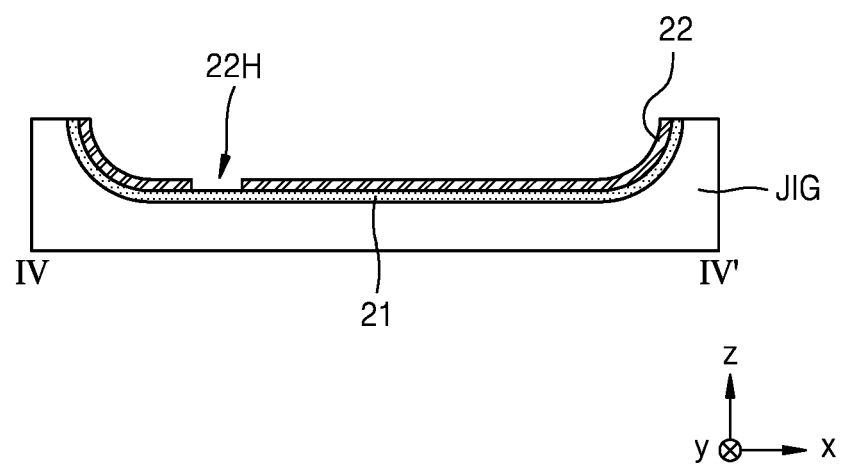

Next, a light-shielding layer 22 may be formed as shown in FIG. 14, by heating the cover window substrate 21 to which the first ink I1 is transferred at about 150° C. for about 10 minutes. That is, the light-shielding layer 22 may be formed when the first ink I1 transferred to the cover window substrate 21 is dried by heating. The light-shielding layer 22 may define a light-shielding layer hole 22H through which a part of the cover window substrate 21 is exposed. The light-shielding layer hole 22H may be formed because the first pad 50 does not contact a part of the cover window substrate 21 and thus, the first ink I1 is not transferred to the part of the cover window substrate 21.

A step of transferring the first ink I1 to the first pad 50, a step of transferring the first ink I1 to the cover window substrate 21, and a step of heating the cover window substrate 21 to which the first ink I1 is transferred at about 150° C. for about 10 minutes, described with reference to FIGS. 7 through 14, may be performed multiple times. That is, because the above steps are performed multiple times, a thickness of the light-shielding layer 22 in the z-axis direction may increase, and thus, the effect of the light-shielding layer 22 that block light so that a wiring or a circuit of the display panel 10 is not identified from the outside may be improved.

Figure 15:
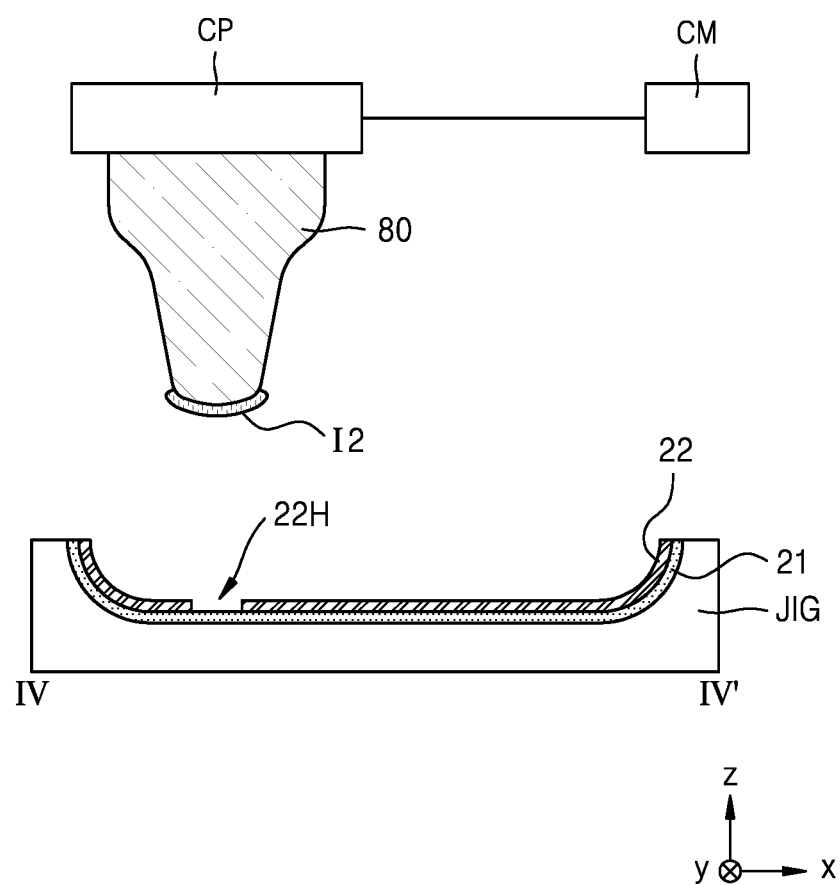
Figure 16:
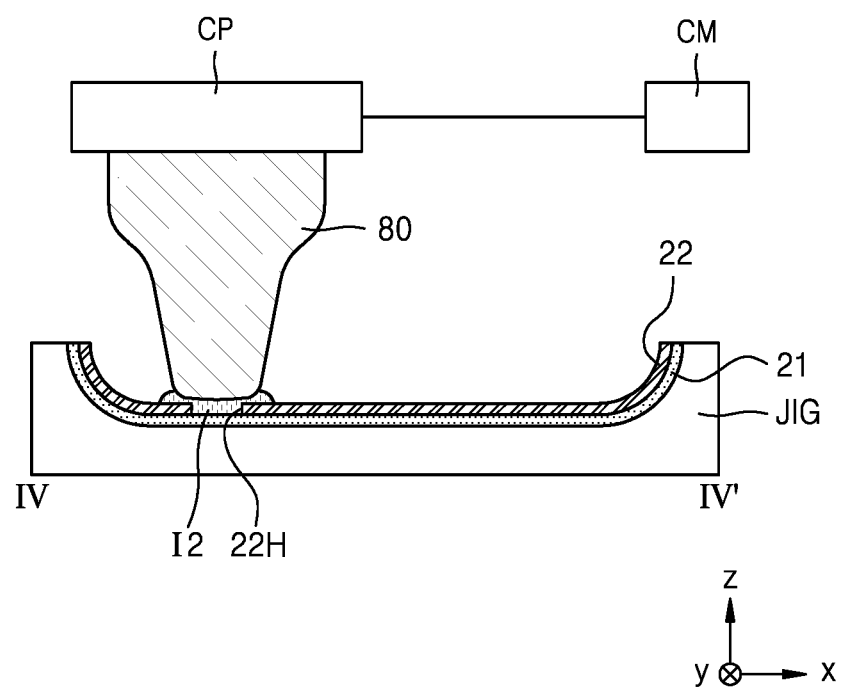

FIGS. 15 and 16 are views for describing a step of transferring second ink I2 to the cover window substrate 21 in a method of manufacturing a cover window, according to an embodiment. FIG. 15 is a cross-sectional view illustrating the cover window substrate 21 taken along line IV-IV' of FIG. 10, especially illustrating a second pad 80 and the cover window substrate 21 when the second pad 80 is located over the cover window substrate 21. FIG. 16 is a cross-sectional view illustrating the cover window substrate 21 taken along line IV-IV' of FIG. 10, especially illustrating the second pad 80 and the cover window substrate 21 when the second pad 80 is pressed against the cover window substrate 21.

First, as shown in FIG. 15, a bottom surface of the second pad 80 (in the −z direction) to which the second ink I2 is transferred may be located to face the cover window substrate 21, and then the second pad 80 and the cover window substrate 21 may be aligned with each other. In detail, the second pad 80 may be located over the cover window substrate 21, so that a central portion of the bottom surface of the second pad 80 (in the −z direction) corresponds to the light-shielding layer hole 22H.

The second ink I2 may be different from the first ink I1. For example, the second ink I2 may include a red, green, or blue dye or pigment. Accordingly, the second ink I2 may have a certain color. A color of the second ink I2 may be determined by a dye or pigment included in the second ink I2. The second ink I2 may be located on a printing plate not including a groove, and the second ink I2 may be transferred to the second pad 80 when the second pad 80 is located on and pressed against the printing plate.

Accordingly, the second ink I2 may be transferred to the bottom surface (in the −z direction) and a part of a side surface of the second pad 80. As described above, the first ink I1 may be transferred to the pad peripheral area 50PA of the first pad 50. That is, in the first pad 50, the first ink I1 may be transferred to an outer portion of a bottom surface surrounding a central portion of the bottom surface of the first pad 50 (in the −z direction) and a part of a side surface of the first pad 50 contacting the outer portion of the bottom surface. However, in the first pad 50, the first ink I1 may not be transferred to the central portion of the bottom surface of the first pad 50 (in the −z direction). When compared to the first pad 50, in the second pad 80, the second ink I2 may be transferred to the central portion of the bottom surface of the second pad 80 (in the −z direction). Also, in the second pad 80, the second ink I2 may be transferred to an outer portion of the bottom surface surrounding the central portion of the bottom surface of the second pad 80 (in the −z direction), and a part of a side surface of the second pad 80 contacting the outer portion. The area of the bottom surface of the second pad 80 (in the −z direction) may be the same as or similar to the area of a part of the cover window substrate 21 exposed through the light-shielding layer hole 22H.

Next, as shown in FIG. 16, the second pad 80 may be pressed against the cover window substrate 21, by pressing the second pad 80. Accordingly, the second ink I2 transferred to the bottom surface of the second pad 80 (in the −z direction) and the part of the side surface of the second pad 80 may be transferred to the cover window substrate 21. In detail, the second pad 80 may be pressed against the part of the cover window substrate 21 exposed through the light-shielding layer hole 22H, and the second ink I2 transferred to the second pad 80 may be transferred to the part of the cover window substrate 21 exposed through the light-shielding layer hole 22H. As described above, the area of the bottom surface of the second pad 80 (in the −z direction) may be the same as or similar to the area of the part of the cover window substrate 21 exposed through the light-shielding layer hole 22H. Accordingly, the second ink I2 may be transferred only to the part of the cover window substrate 21 exposed through the light-shielding layer hole 22H and a part of the light-shielding layer 22 adjacent to the part of the cover window substrate 21, and may not be transferred to other areas.

Like the first pad 50, the second pad 80 may be attached to a surface of the connecting unit CP, and may be connected to the control device CM. The description of a relationship among the first pad 50, the connecting unit CP, and the control device CM may apply to a relationship among the second pad 80, the connecting unit CP, and the control device CM, and thus a repeated description will be omitted.

When a portion of the cover window substrate 21 to which the second ink I2 is transferred is a portion of the cover window substrate 21 contacting the first pad 50, it may not be easy to transfer the second ink I2 to the portion of the cover window substrate 21. That is, in a process of transferring the first ink I1 to the cover window substrate 21, the second ink I2 may be transferred to the portion of the cover window substrate 21 contacting the first pad 50. In this case, a surface of the portion of the cover window substrate 21 may be contaminated with a foreign material. For example, when the first pad 50 includes a silicon-based compound, a surface of the portion of the cover window substrate 21 contacting the first pad 50 may be contaminated with silicone oil. Accordingly, it may not be easy to transfer the second ink I2 to the portion of the cover window substrate 21 contacting the first pad 50.

However, in a method of manufacturing a cover window according to the present embodiment, the first pad 50 may include the pad groove 50G. Accordingly, a portion of the cover window substrate 21 corresponding to the pad groove 50G of the first pad 50 may not contact the first pad 50 in a process of transferring to the first ink I1 to the cover window substrate 21. Accordingly, a surface of the portion of the cover window substrate 21 to which the second ink I2 is transferred may not be contaminated with a foreign material. In detail, in a method of manufacturing a cover window according to the present embodiment, a surface of the part of the cover window substrate 21 exposed through the light-shielding layer hole 22H may have a C content ranging from about 15 at % to about 16 at % and an Si content ranging from about 19 at % to about 20 at %. That is, the surface of the part of the cover window substrate 21 exposed through the light-shielding layer hole 22H may not be contaminated with a foreign material. Accordingly, when the second ink I2 is transferred to the cover window substrate 21, the second ink I2 may be easily transferred to the cover window substrate 21. Accordingly, the risk of defects in a manufacturing process may be reduced.

Figure 17:
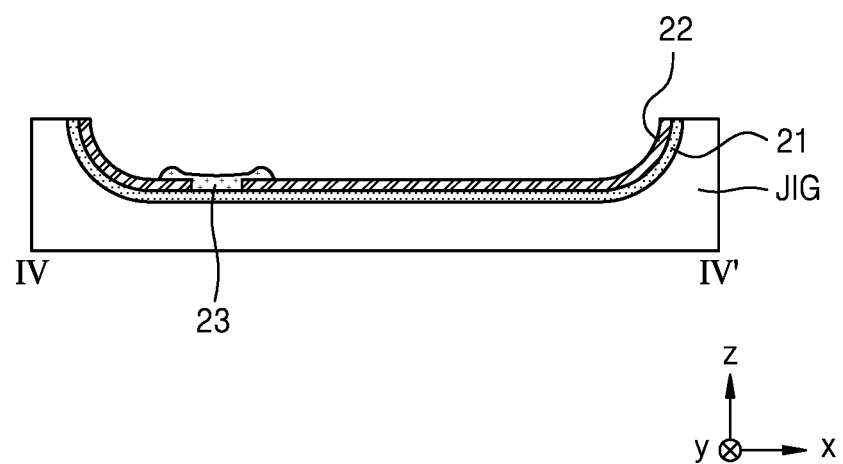

Next, a color layer 23 may be formed as shown in FIG. 17, by heating the cover window substrate 21 to which the second ink I2 is transferred at about 150° C. for about 10 minutes. That is, the color layer 23 may be formed when the second ink I2 transferred to the cover window substrate 21 is dried by heating. The color layer 23 may cover the light-shielding layer hole 22H. That is, a part of the color layer 23 may be formed in the light-shielding layer hole 22H, and a part of the color layer 23 may be formed on a part of the light-shielding layer 22 adjacent to the light-shielding layer hole 22H.

Although a method of manufacturing a cover window has been described, the disclosure is not limited thereto. For example, the cover window 20 manufactured by the manufacturing method also falls within the scope of the disclosure. The cover window 20 will now be described. The effect of the cover window 20 manufactured as above has been described, and thus, a repeated description will be omitted and only a structure of the cover window 20 will be described. For convenience of explanation, the same description as that made with reference to FIGS. 1 through 17 will be omitted.

Figure 18:
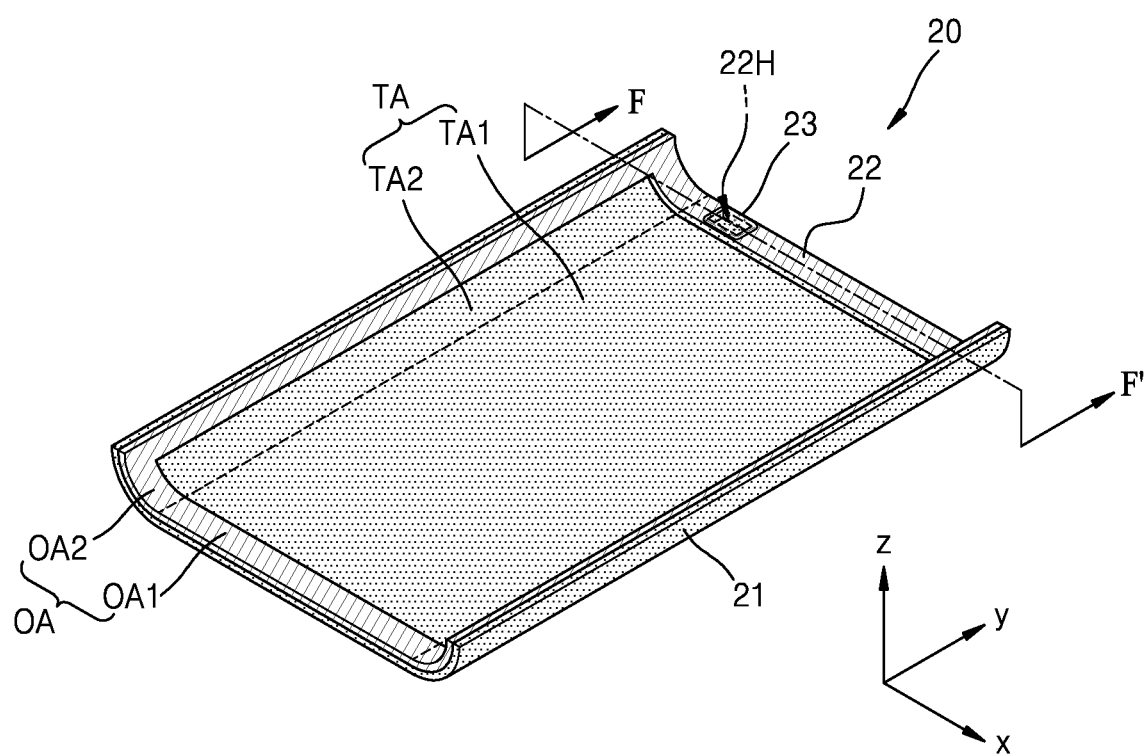
FIG. 18 is a perspective view illustrating a cover window, according to an embodiment.
Figure 19:
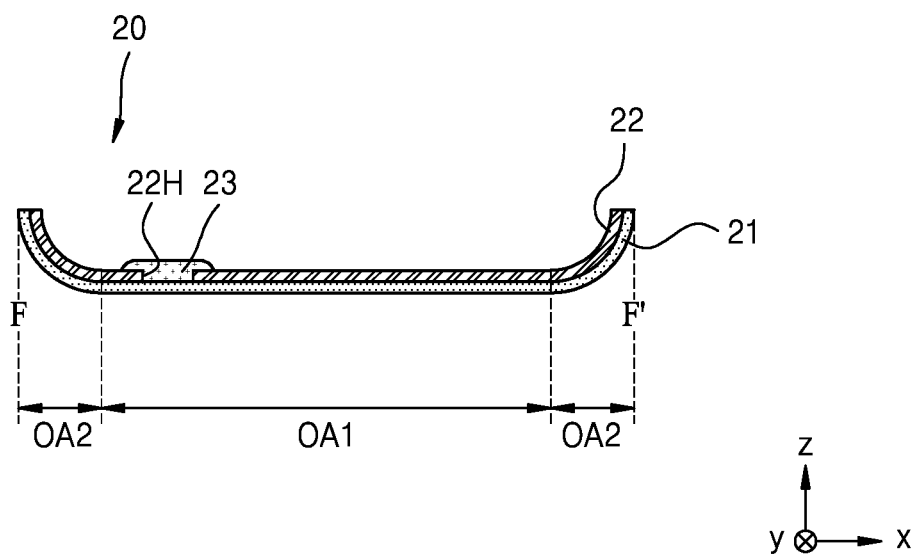
FIGS. 19 and 20 are cross-sectional views illustrating a cover window, according to an embodiment.

FIG. 18 is a perspective view illustrating the cover window 20, according to an embodiment. FIG. 19 is a cross-sectional view illustrating the cover window 20, according to an embodiment. In detail, FIG. 19 is a cross-sectional view schematically illustrating the cover window 20 taken along line F-F' of FIG. 18. For convenience of explanation, FIGS. 18 and 19 illustrate the cover window 20 separated from the display panel 10. FIGS. 18 and 19 illustrate a state where the cover window 20 is turned upside down so that a rear surface of the cover window 20 faces upward.

As shown in FIG. 18, the cover window 20 may include a transparent area TA and an opaque area corresponding to the display area DA and the non-display area NDA illustrated in FIG. 1, respectively. The transparent area TA may include a first transparent area TA1 and a second transparent area TA2, and the opaque area OA may include a first opaque area OA1 and a second opaque area OA2. That is, the first transparent area TA1, the second transparent area TA2, the first opaque area OA1, and the second opaque area OA2 may correspond to the first display area DA1, the second display area DA2, the first non-display area NDA1, and the second non-display area NDA2, respectively. Positions and shapes of the first transparent area TA1, the second transparent area TA2, the first opaque area OA1, and the second opaque area OA2 may correspond to positions and shapes of the first display area DA1, the second display area DA2, the first non-display area NDA1, and the second non-display area NDA2, respectively. In detail, the second transparent area TA2 may be located on opposite sides of the first transparent area TA2 in the first direction (e.g., the x direction or the −x direction), the first opaque area OA1 may be located on opposite sides of the first transparent area TA1 in the second direction (e.g., the y direction or the −y direction), and the second opaque area OA2 may surround the second transparent area TA2. Accordingly, a repeated description thereof will be omitted.

The transparent area TA may be an optically transparent area. Accordingly, the display panel 10 may display an image through the first transparent area TA1 and the second transparent area TA2, which are optically transparent, of the cover window 20. Like in a relationship between the display area DA and the non-display area NDA, in an embodiment, the transparent area TA may be surrounded by the opaque area OA. A light transmittance of the opaque area OA may be less than a light transmittance of the transparent area TA.

The cover window 20 may include the cover window substrate 21, the light-shielding layer 22, and the color layer 23. The cover window substrate 21 may have substantially the same shape as a shape of the cover window 20. The cover window substrate 21 may include glass, sapphire, or plastic. For example, the cover window substrate 21 may be an ultra-thin glass (UTG®) whose strength is increased by using a method such as chemical strengthening or thermal strengthening, or colorless polyimide ("CPI"). The cover window substrate 21 may have a structure in which a flexible polymer layer is located on a surface of a glass substrate, or may include only a polymer layer. Because the cover window 20 includes the cover window substrate 21, the cover window substrate 21 may include the first transparent area TA1, the second transparent area TA2, the first opaque area OA1, and the second opaque area OA2. For convenience of explanation, the following will be described assuming that the cover window substrate 21 includes the first transparent area TA1, the second transparent area TA2, the first opaque area OA1, and the second opaque area OA2.

The light-shielding layer 22 may be located on the cover window substrate 21. In detail, the light-shielding layer 22 may be located in the opaque area OA. In an embodiment, the light-shielding layer 22 may include a light-shielding material. That is, the light-shielding layer 22 may include an opaque material that blocks light so that a wiring or a circuit of the display panel 10 is not identified from the outside. The light-shielding material may include at least one of a black dye and black particles. For example, the light-shielding material may include Cr, $CrO_X$, $Cr/CrO_X$, $Cr/CrO_X/CrN_Y$, a resin (carbon pigment or RGB mixed pigment), graphite, a non-Cr based material, a lactam-based pigment, or a perylene-based pigment. The light-shielding material may include a black organic pigment, and the black organic pigment may include at least one selected from the group consisting of aniline black, lactam black, and perylene black.

The light-shielding layer 22 may define the light-shielding layer hole 22H through which a part of the cover window substrate 21 is exposed. In an embodiment, the light-shielding layer hole 22H may be defined on an upper side of the cover window 20. In detail, the light-shielding layer hole 22H may be defined in the first opaque area OA1 located on an upper side of the first transparent area TA1. However, the disclosure is not limited thereto. For example, the light-shielding layer hole 22H may be defined in the first opaque area OA1 located on a lower side of the first transparent area TA1.

As shown in FIG. 19, the color layer 23 may fill the light-shielding layer hole 22H. In detail, the color layer 23 may be located in the light-shielding layer hole 22H. In an embodiment, a part of the color layer 23 may be located in the light-shielding layer hole 22H, and another part of the color layer 23 may be located on a portion of the light-shielding layer 22 adjacent to the light-shielding layer hole 22H. The color layer 23 may include a red, green, or blue dye or pigment. Accordingly, the color layer 23 may have a certain color. A color of the color layer 23 may be determined by a dye or pigment included in the color layer 23. Although not shown in FIG. 19, the display apparatus 1 may include a component located under the color layer 23. That is, the component may overlap the color layer 23. The component is a camera using infrared light or visible light, and may include an image pickup device. Alternatively, the component may include at least one of a flash, a proximity sensor, an illumination sensor, and an infrared ("IR") sensor. Because the color layer 23 blocks only a smaller amount of light than the light-shielding layer 22, external light may reach the component through the color layer 23 or light from the component may reach the outside.

A C content and an Si content of an interface of the cover window substrate 21 contacting the color layer 23 may be lower than a C content and an Si content of a surface of the cover window substrate 21 in the transparent area TA and close to the light-shielding layer 22. The 'interface of the cover window substrate contacting the color layer' used herein refers to a portion of the cover window substrate 21 from a contact point between the cover window substrate 21 and the color layer 23 to a depth of about 10 nm inside the cover window substrate 21, and the 'surface of the cover window substrate' used herein refers to a portion of the cover window substrate 21 from a contact point between the cover window substrate 21 and the outside of the cover window substrate 21 to a depth of about 10 nm inside the cover window substrate 21. That is, a C content and an SI content of the surface of the cover window substrate 21 in the transparent area TA and close to the light-shielding layer 22 may be higher than a C content and an Si content of the interface of the cover window substrate 21 contacting the color layer 23. For example, the surface of the cover window substrate 21 in the transparent area TA and close to the light-shielding layer 22 may have a C content ranging from about 31 at % to about 33 at % and an Si content ranging from about 23 at % to about 24 at %, and the interface of the cover window substrate 21 contacting the color layer 23 may include a C content ranging from about 15 at % to 16 at % and an Si content ranging from about 19 at % to about 20 at %.

Figure 20:
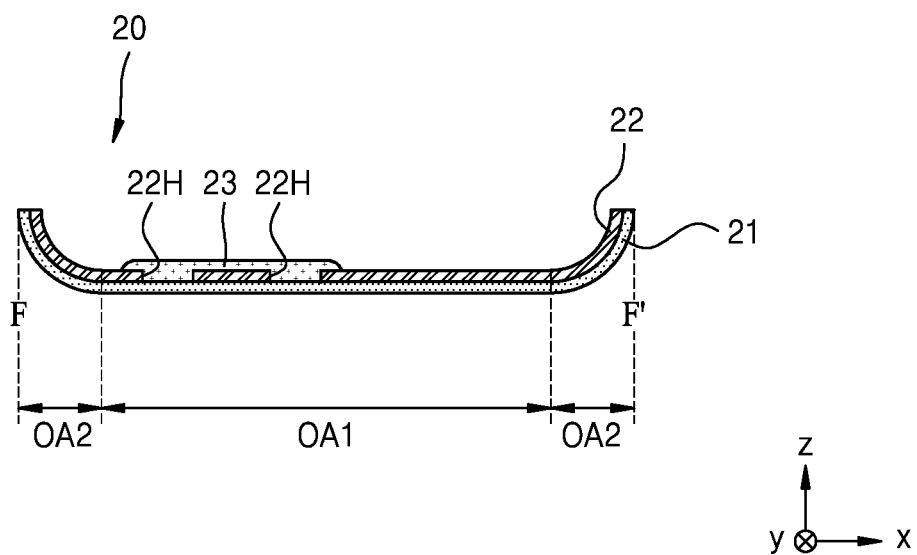

Although the light-shielding layer 22 defines only one light-shielding layer hole 22H in FIG. 19, the disclosure is not limited thereto. For example, as shown in FIG. 20 that is a cross-sectional view schematically illustrating a part of the cover window 20 according to an embodiment, a plurality of light-shielding layer holes 22H may be provided. The light-shielding layer holes 22H may be defined in the first opaque area OA1, and the light-shielding layer holes 22H may be spaced apart from each other.

In this case, the color layer 23 may fill the plurality of light-shielding layer holes 22H. In detail, one integrally formed color layer 23 may fill the plurality of light-shielding layer holes 22H. Alternatively, a plurality of color layers 23 may be provided, and each of the color layers 23 may fill the light-shielding layer hole 22H. Accordingly, colors of the plurality of color layers 23 filling the plurality of light-shielding layer holes 22H, respectively, may be different from each other. However, the disclosure is not limited thereto, and even when the plurality of color layers 23 fill the plurality of light-shielding layer holes 22H, colors of the plurality of color layers 23 may be the same. The plurality of light-shielding layer holes 22H may have the same or similar shape(s), and may have the same size or similar sizes. Alternatively, the plurality of light-shielding layer holes 22H may have different shapes or may have different sizes.

As described above, according to an embodiment, a cover window in which the risk of defects in a manufacturing process may be reduced and a method of manufacturing the cover window may be realized. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A method of manufacturing a cover window, the method comprising:
   providing first ink to a printing plate;
   transferring the first ink to a first pad comprising a pad central area and a pad peripheral area, wherein the pad central area comprises a central portion of a bottom surface of the first pad, and the pad peripheral area surrounds the pad central area and defines a pad groove therein; and
   transferring the first ink to a cover window substrate from the first pad,
   wherein the transferring of the first ink to the first pad comprises transferring the first ink to the pad peripheral area.

2. The method of claim 1, wherein the transferring of the first ink to the first pad comprises not transferring the first ink to a portion of the pad peripheral area in which the pad groove is defined.

3. The method of claim 1, wherein the pad peripheral area comprises an outer portion of the bottom surface surrounding the central portion of the bottom surface of the first pad and a part of a side surface of the first pad contacting the outer portion of the bottom surface.

4. The method of claim 1, wherein the first ink comprises a light-shielding material.

5. The method of claim 1, wherein the printing plate comprises a printing plate central area and a printing plate peripheral area surrounding the printing plate central area, and the printing plate peripheral area defines a printing plate groove therein,
   wherein the providing of the first ink to the printing plate comprises filling the printing plate groove with the first ink.

6. The method of claim 5, wherein the printing plate groove extends along an outer side of the printing plate central area.

7. The method of claim 5, wherein the transferring of the first ink to the first pad comprises transferring the first ink to the first pad, by pressing the first pad to the printing plate in a state that the printing plate groove is filled with the first ink.

8. The method of claim 7, wherein the transferring of the first ink to the first pad comprises transferring the first ink filling the printing plate groove to the first pad.

9. The method of claim 5, wherein the transferring of the first ink to the first pad comprises causing the pad central area to contact the printing plate central area and the pad peripheral area to contact the first ink filling the printing plate groove.

10. The method of claim 9, wherein the transferring of the first ink to the first pad comprises causing a portion of the pad peripheral area in which the pad groove is defined not to contact the first ink filling the printing plate groove.

11. The method of claim 1, wherein the transferring of the first ink to the cover window substrate comprises transferring the first ink to the cover window substrate, by pressing the first pad to which the first ink is transferred to the cover window substrate.

12. The method of claim 9, wherein the transferring of the first ink to the cover window substrate comprises transferring the first ink transferred to the first pad to the cover window substrate.

13. The method of claim 9, wherein the transferring of the first ink to the cover window substrate comprises causing the pad central area and the pad peripheral area to contact the cover window substrate.

14. The method of claim 9, wherein the transferring of the first ink to the cover window substrate comprises causing a portion of the pad peripheral area in which the pad groove is defined not to contact the cover window substrate.

15. The method of claim 1, wherein the first pad comprises a silicon-based compound.

16. The method of claim 1, further comprising:
   forming a light-shielding layer and a light-shielding layer hole on the cover window substrate, by heating the cover window substrate to which the first ink is transferred at about 150 degrees in Celsius (° C.) for about 10 minutes.

17. The method of claim 16, further comprising:
   transferring second ink, different from the first ink, to the cover window substrate; and
   forming a color layer covering the light-shielding layer hole, by heating the cover window substrate to which the second ink is transferred at about 150° C. for about 10 minutes.

18. The method of claim 17, wherein the transferring of the second ink, different from the first ink, to the cover window substrate comprises transferring the second ink to a part of the cover window substrate exposed through the light-shielding layer hole, by pressing a second pad to which the second ink is transferred to the cover window substrate.

19. A cover window comprising:
   a cover window substrate comprising a transparent area and an opaque area, wherein the transparent area comprises a first transparent area and a second transparent area located on opposite sides of the first transparent area in a first direction, and the opaque area comprises a first opaque area located on opposite sides of the first transparent area in a second direction crossing the first direction and a second opaque area surrounding the second transparent area;
   a light-shielding layer located in the opaque area; and
   a color layer filling a light-shielding layer hole defined in the first opaque area,
   wherein a carbon (C) content or a silicon (Si) content of an interface of the cover window substrate contacting the color layer is lower than a C content or an Si content of a surface of the cover window substrate located in the transparent area and close to the light-shielding layer.

20. The cover window of claim 19, wherein
the interface of the cover window substrate contacting the color layer has a C content ranging from about 15 atomic percentages (at %) to about 16 at %, and
the surface of the cover window substrate in the transparent area and close to the light-shielding layer has a C content ranging from 31 at % to 33 at %.

21. The cover window of claim 19, wherein
the interface of the cover window substrate contacting the color layer has an Si content ranging from about 19 at % to about 20 at %, and
the surface of the cover window substrate in the transparent area and close to the light-shielding layer has an Si content ranging from about 23 at % to about 24 at %.

* * * * *